(12) United States Patent
Shao et al.

(10) Patent No.: US 11,721,191 B1
(45) Date of Patent: Aug. 8, 2023

(54) METHOD AND SYSTEM FOR FLOOD EARLY WARNING IN SMART CITY BASED ON INTERNET OF THINGS

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Bin Liu, Chengdu (CN); Yaqiang Quan, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/810,647

(22) Filed: Jul. 5, 2022

(30) Foreign Application Priority Data

May 16, 2022 (CN) .......................... 202210527176.7

(51) Int. Cl.
*G16Y 40/50* (2020.01)
*G08B 21/10* (2006.01)

(52) U.S. Cl.
CPC .................................... *G08B 21/10* (2013.01)

(58) Field of Classification Search
CPC ........ G08B 21/10; G06Q 40/08; G01S 19/51; G06N 3/006; G01F 23/0007
See application file for complete search history.

(56) References Cited

U.S. PATENT DOCUMENTS

2018/0340812 A1* 11/2018 Den Hartog ........ G01F 23/0007
2020/0143481 A1* 5/2020 Brown ................... G06N 20/20

FOREIGN PATENT DOCUMENTS

| CN | 103345815 A |   | 10/2013 |
|----|-------------|---|---------|
| CN | 103944946 A |   | 7/2014  |
| CN | 106021970 A |   | 10/2016 |
| CN | 108446464 A |   | 8/2018  |
| CN | 110646867 A | * | 1/2020  |
| CN | 112733337 A |   | 4/2021  |
| CN | 113505546 A | * | 10/2021 |
| CN | 113781813 A |   | 12/2021 |

OTHER PUBLICATIONS

The Third Office Action in Chinese Application No. 202210527176.7 dated Sep. 15, 2022, 8 pages.
(Continued)

*Primary Examiner* — An T Nguyen
(74) *Attorney, Agent, or Firm* — Metis IP LLC

(57) ABSTRACT

The present disclosure provides a method and system for flood early warning in a smart city based on Internet of Things (IoT). The method includes: obtaining precipitation information of a target area within a target time period through a meteorological management platform, obtaining drainage capacity information of the target area through a water affairs platform, determining regional ponding information of the target area in the target time period based on the precipitation information and the drainage capacity information, and generating a first flood early warning information of the target area based on the regional ponding information.

8 Claims, 11 Drawing Sheets

(56) References Cited

OTHER PUBLICATIONS

Shao, Zehua, Exploration and Research on the Structure of Internet of Things, Internet of Things Technologies Reliable Transmission, 2015, 10 pages.
Shao, Zehua, The Internet of Things sense the world beyond the world, China Renmin University Press, 2017, 30 pages.
Shao, Zehua, Smart City Architecture, Internet of Things Technologies Intelligent Processing and Application, 2016, 7 pages.
First Office Action in Chinese Application No. 202210527176.7 dated Jul. 5, 2022, 16 pages.
The Second Office Action in Chinese Application No. 202210527176.7 dated Aug. 5, 2022, 22 pages.

* cited by examiner

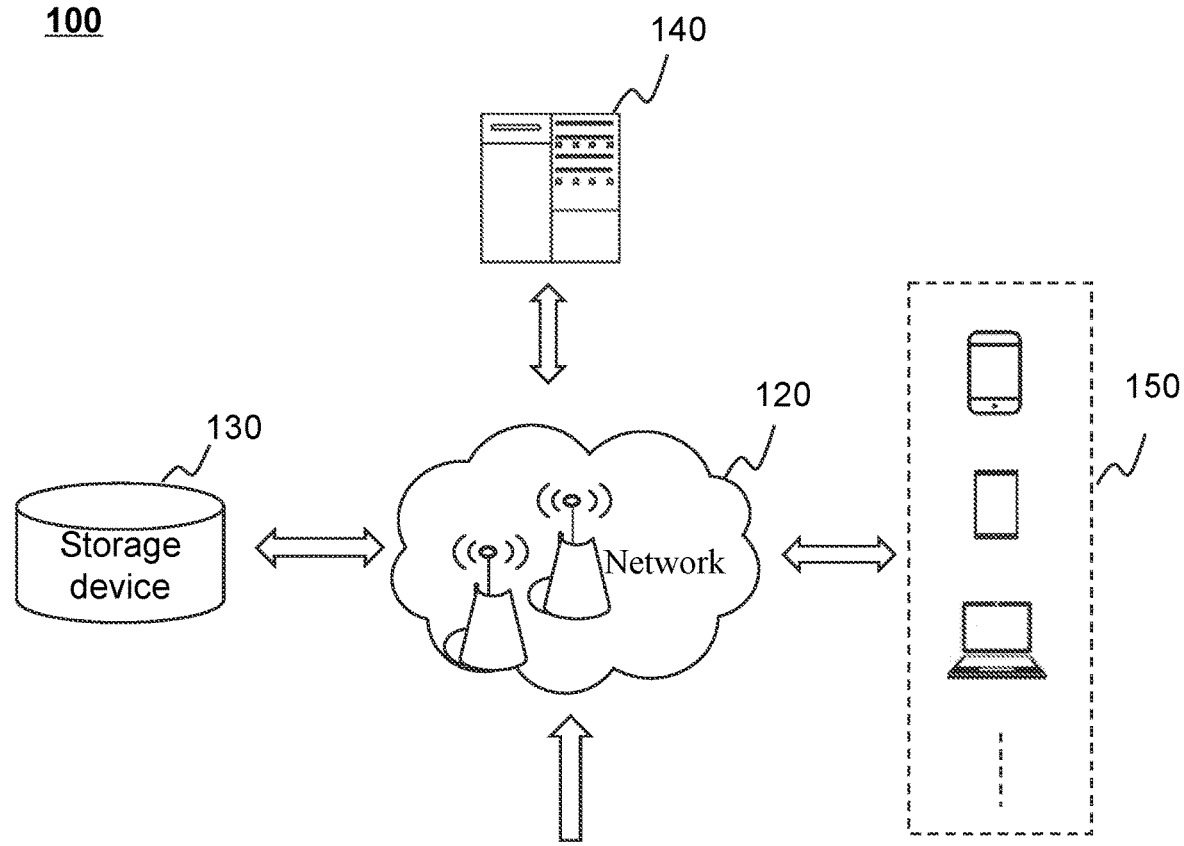
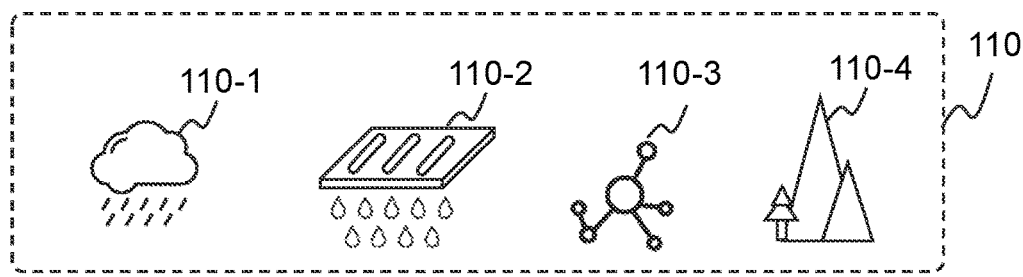
FIG. 1

400

```
┌─────────────────────────────────────────────┐  410
│  Obtaining the road network information of  │
│  the target area through the traffic        │
│  management platform                        │
└─────────────────────────────────────────────┘
                      │
                      ▼
┌─────────────────────────────────────────────┐  420
│  Obtaining the historical regional ponding  │
│  information of the target area and the     │
│  historical road ponding information of     │
│  each road in the target area through the   │
│  water affairs platform                     │
└─────────────────────────────────────────────┘
                      │
                      ▼
┌─────────────────────────────────────────────┐  430
│  Determining the road ponding information   │
│  of each road in the target area within the │
│  target time period according to the road   │
│  network information, historical regional   │
│  ponding information, and historical road   │
│  ponding information                        │
└─────────────────────────────────────────────┘
                      │
                      ▼
┌─────────────────────────────────────────────┐  440
│  Determining the ponding sections in the    │
│  target area based on the road ponding      │
│  information                                │
└─────────────────────────────────────────────┘
                      │
                      ▼
┌─────────────────────────────────────────────┐  450
│  Generating the second flood early warning  │
│  information of the target area according   │
│  to the ponding sections in the target area │
└─────────────────────────────────────────────┘
```

FIG. 4

METHOD AND SYSTEM FOR FLOOD EARLY WARNING IN SMART CITY BASED ON INTERNET OF THINGS

CROSS-REFERENCE TO RELATED APPLICATION

This application claims priority of Chinese Application No. 202210527176.7, filed on May 16, 2022, the entire contents of each of which are hereby incorporated by reference.

TECHNICAL FIELD

The present disclosure relates to the field of the Internet of Things (IoT), in particular to a method and system for flood early warning in smart city based on IoT.

BACKGROUND

In modern life, flood refers to disasters caused by mountain torrents, river surges, urban ponding, snow melting, etc. Flood usually causes the roads in the urban area to accumulate water or even be submerged, which brings great inconvenience to the urban traffic and normal life.

Therefore, it is desirable to provide a method and system for flood early warning in smart city based on the Internet of Things (IoT). The method may be used for flood early warning based on the IoT, so as to avoid people going to flood areas blindly. At the same time, it may enable the rescue party to quickly carry out emergency rescue.

SUMMARY

One or more embodiments of the present disclosure provide a method for flood early warning in a smart city based on the Internet of Things (IoT). The method includes: obtaining precipitation information of a target area within a target time period through a meteorological management platform, obtaining drainage capacity information of the target area through a water affairs platform, determining regional ponding information of the target area in the target time period based on the precipitation information and the drainage capacity information, and generating a first flood early warning information of the target area based on the regional ponding information.

One or more embodiments of the present disclosure provide a system for flood early warning in smart city based on the IoT. The system includes a user platform, a service platform, a flood warning management platform, a sensor network platform and an object platform. The flood warning management platform is configured to perform operations including: obtaining precipitation information of a target area within a target time period through a meteorological management platform, obtaining drainage capacity information of the target area through a water affairs platform, determining regional ponding information of the target area within the target time period based on the precipitation information and the drainage capacity information, and generating a first flood early warning information of the target area based on the regional ponding information.

One or more embodiments of the present disclosure provide a non-transitory computer-readable storage medium. The storage medium stores computer instructions. When the computer reads the computer instructions in the storage medium, the computer runs the method for flood early warning in smart city based on IoT described in any one of the above embodiments.

BRIEF DESCRIPTION OF THE DRAWINGS

The present disclosure will be further described in the form of exemplary embodiments, which will be described in detail by the accompanying drawings. These embodiments are not restrictive. In these embodiments, the same number represents the same structure, wherein:

FIG. 1 is a schematic diagram of an application scenario of a system for a flood early warning in a smart city according to some embodiments of the present disclosure;

FIG. 4 is an exemplary flowchart of a method for determining ponding sections according to some embodiments of the present disclosure;

DETAILED DESCRIPTION

Figure 2:
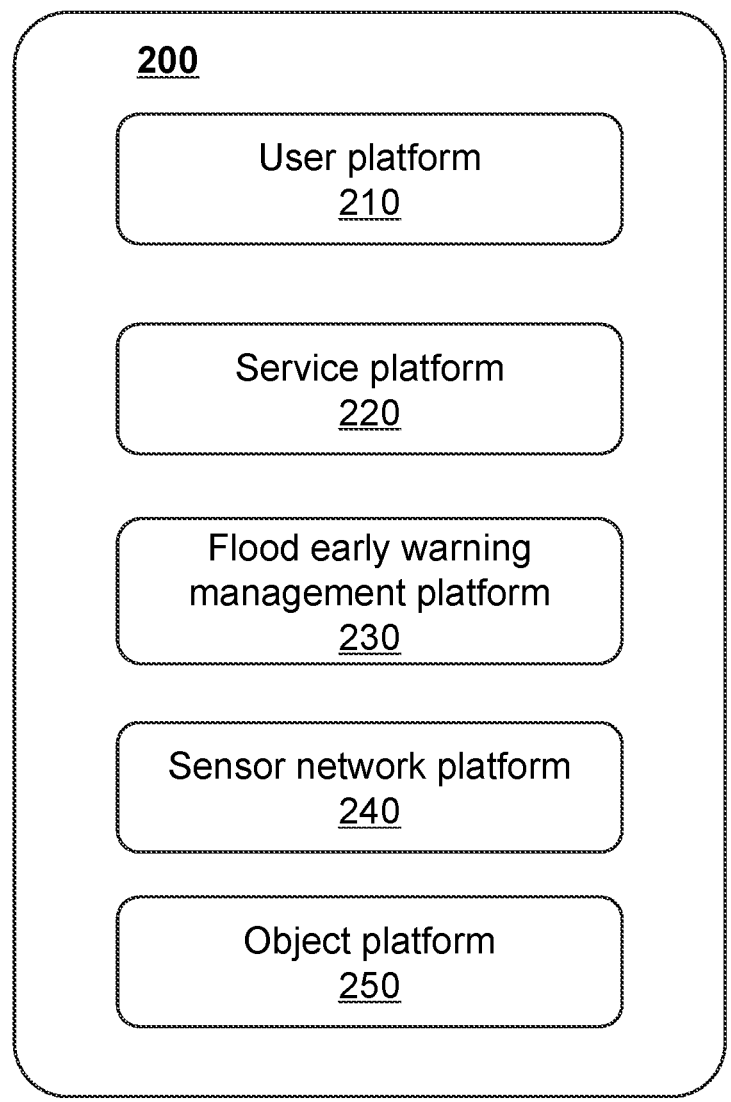
FIG. 2 is a schematic diagram of a system for a flood early warning in a smart city according to some embodiments of the present disclosure.

In order to more clearly explain the technical scheme of the embodiments in the present disclosure, the following will briefly introduce the drawings that need to be used in the descriptions of the embodiments. Obviously, the drawings in the following descriptions are only some examples or embodiments of the present disclosure. For those skilled in the art, the present disclosure may also be applied to other similar scenarios according to these drawings without creative work. Unless obviously obtained from the context or the context illustrates otherwise, the same numeral in the drawings refers to the same structure or operation.

It should be understood that the "system," "device," "unit," and/or "module" used herein is a method for distinguishing different components, elements, components, parts or assemblies at different levels. However, if other words may achieve the same purpose, they may be replaced by other expressions.

As shown in the present disclosure and claims, unless the context is clearly reminded, the words "one," "a," "a kind of," and/or "the" do not specially refer to a singular, but also include plural. In general, the terms "include" and "contain"

only suggest the inclusion of clearly identified steps and elements. These steps and elements do not constitute an exclusive list, and the method or equipment may also contain other steps or elements.

Flowcharts are used in the present disclosure to explain the operations performed by the system according to the embodiments of the present disclosure. It should be understood that the preceding or subsequent operations are not necessarily performed accurately in sequence. Instead, you may process the steps in reverse order or simultaneously. At the same time, other operations may be added to these procedures, or one or more operations may be removed from these procedures.

FIG. 1 is a schematic diagram of an application scenario of a system for a flood early warning in a smart city according to some embodiments of the present disclosure.

In some embodiments, the application scenario 100 of the system for flood warning in the smart city may include the relevant information 110 of the target area, the network 120, the storage device 130, the processing device 140, and the terminal 150. In some embodiments, components in the application scenario 100 may be connected and/or communicate with each other through the network 120 (such as wireless connection, wired connection, or its combination). For example, the processing device 140 may be connected to the storage device 130 through the network 120.

The relevant information 110 of the target area refers to the information used for flood early warning in one or more locations or areas that may be subject to the floods or are suffering from floods. In some embodiments, the relevant information 110 of the target area may include, but is not limited to, precipitation information 110-1, drainage capacity information 110-2, road network information 110-3, environmental information 110-4, etc. of the target area. For more information about precipitation information 110-1, drainage capacity information 110-2, road network information 110-3, and environmental information 110-4, please refer to FIGS. 3-6 and related descriptions. In some embodiments, the relevant information 110 of the target area may be transmitted to the processing device 140 and/or the terminal 150 via the network for processing to generate the relevant information of flood early warning such as the first flood early warning information.

The network 120 may include any suitable network that is capable of facilitating information and/or data exchange of the application scenario 100. In some embodiments, one or more components of application scenario 100 (e.g. processing device 140, storage device 130, and terminal 150) may exchange information and/or data over the network 120. The network 120 may include a local area network (LAN), a wide area network (WAN), a wired network, a wireless network, or the like, or any combination thereof. In some embodiments, the network 120 may be any one or more of wired network or wireless network. In some embodiments, the network 120 may include one or more network access points. For example, the network 120 may include wired or wireless network access points, such as base stations and/or network switching points. Through these network access points, one or more components of application scenario 100 may connect to the network 120 to exchange data and/or information.

The storage device 130 may be operable to store data, instructions, and/or any other information. In some embodiments, the storage device 130 may be part of the processing device 140. In some embodiments, the storage device 130 may communicate with at least one component of the application scenario 100 (e.g., the processing device 140, the terminal 150). In some embodiments, the storage device 130 may store data and/or instructions used by the processing device 140 to execute or use to complete the exemplary methods described in the present disclosure. For example, the storage device 130 may store preset conditions for determining the risk level of ponding. As another example, the storage device 130 may store one or more machine learning models. In some embodiments, the storage device 130 may also include mass memory, removable memory, or any combination thereof.

The processing device 140 may process information and/or data related to the application scenario 100 of the system for flood early warning in the smart city to perform one or more functions described in the present disclosure. For example, the processing device 140 may determine the regional ponding risk level of the target area based on the precipitation information and drainage capacity information of the target area. In some embodiments, the processing device 140 may include one or more processing engines (e.g., a single chip processing engine or a multi-chip processing engine). As an example only, the processing device 140 may include a central processing unit (CPU). The processing device 140 may process data, information, and/or processing results obtained from other devices or system components, and execute program instructions based on these data, information and/or processing results to perform one or more functions described in the present disclosure.

The terminal 150 may refer to one or more terminals or software used by the user. In some embodiments, the user (e.g., a flood warning manager, a flood rescue command expert, etc.) may be the owner of the terminal 150. In some embodiments, the terminal 150 may include a mobile device, a tablet computer, a notebook computer, a wearable smart terminal, or the like, or any combination thereof. In some embodiments, the terminal 150 may be a device having a positioning function. For example, the terminal 150 may be a mobile device of a target person. Mobile devices may receive information that water may accumulate in a certain area and try not to travel to the area. For another example, the terminal 150 may be a paging device of the rescue party, and the paging device may receive the rescue reminder information.

It should be noted that the application scenario 100 of the system for flood early warning in the smart city is provided for illustrative purposes only and not intended to limit the scope of the application. For those skilled in the art, a variety of modifications or changes may be made according to the description of the present disclosure. For example, the application scenario 100 of the system for flood early warning in the smart city may realize similar or different functions on other devices. However, these changes and modifications do not deviate from the scope of the application.

The IoT system is an information processing system that includes some or all of a user platform, a service platform, a management platform, a sensor network platform, and an object platform. The user platform refers to a platform dominated by users, which may obtain users' needs and feedback information to users. Service platform refers to a platform that may provide input and output services for users. The management platform may coordinate the connection and cooperation between various functional platforms (such as the sensor network platform and the object platform), gather the information of the IoT operation system, and provide the perception management and control management functions for the IoT operation system. The sensor network platform may realize the connection management platform and object platform and play the functions of sensing information sensing communication and controlling information sensing communication. The object platform is a functional platform for generating and executing perceptual information and control information.

The information processing in the IoT system may be divided into the processing flow of perception information and the processing flow of control information. The control information may be the information generated based on perception information. The processing of perceptual information is that the object platform obtains the perceptual information and transmits it to the management platform through the sensor network platform. The control information is distributed by the management platform to the object platform through the sensor network platform, so as to control the corresponding object.

In some embodiments, when the IoT system is applied to flood early warning, it may be called as the system for flood early warning in the smart city based on the IoT.

FIG. 2 is a schematic diagram of a system for a flood early warning in a smart city according to some embodiments of the present disclosure. As shown in FIG. 2, the system 200 for flood early warning in the smart city may be implemented based on the IoT system. The system 200 for flood early warning in the smart city includes a user platform 210, a service platform 220, a flood warning management platform 230, a sensor network platform 240, and an object platform 250. In some embodiments, the system 200 for flood early warning in the smart city may be part of or implemented by the processing device 140.

The user platform 210 may refer to a platform dominated by users. For example, the user platform may obtain the user's input instructions through the terminal (e.g., terminal 140) and receive flood early warning information (e.g., the first flood early warning information, the second flood early warning information, the third flood early warning information, etc.).

The service platform 220 refers to a platform that may provide input and output services for users. For example, the service platform may send the first flood early warning information to the user platform.

The flood early warning management platform 230 may coordinate the connection and cooperation between various functional platforms and gather all the information of the Internet of Things, which is a platform for providing perception management and control management functions for the operation system of the IoT. For example, the flood early warning management platform 230 may obtain the precipitation information of the target area within the target time period through the meteorological management platform, obtain the drainage capacity information of the target area through the water affairs platform, determine the regional ponding information of the target area within the target time period based on the precipitation information and drainage capacity information, and generate the first flood early warning information of the target area according to regional ponding information. The flood early warning management platform may include the processing device in FIG. 1 and other components. In some embodiments, the flood warning management platform may be a remote platform controlled by managers, artificial intelligence, or preset rules.

The sensor network platform 240 may refer to a functional platform that manages sensor communications. In some embodiments, the sensor network platform 240 may connect the flood early warning management platform 230 and the object platform 250 to realize the functions of sensing information sensing communication and controlling information sensing communication. In some embodiments, the sensor network platform may include a plurality of sensor network sub-platforms.

The object platform 250 may refer to a functional platform for perceptual information generation. In some embodiments, the object platform may obtain information. For example, the object platform obtains road ponding information in different target areas.

In some embodiments, the system 200 for flood early warning in the smart city may be applied to a variety of scenarios of flood early warning. In some embodiments, the system 200 for flood early warning in the smart city may obtain the relevant information of flood early warning in a variety of scenarios in the target area (for example, precipitation information, drainage capacity information, road network information, historical ponding information, environmental information, road monitoring information, etc.) to obtain the flood early warning information under each scenario (such as the first flood early warning information, the second flood early warning information, the third flood early warning information, etc.). In some embodiments, the system 200 for flood early warning in the smart city may obtain the flood early warning information of the whole region (such as the whole city) based on the relevant data of flood early warning under various scenarios.

A variety of scenarios for flood early warning may include schools, subways, roads, construction sites, residential areas, shopping malls, offices, etc. For example, it may include warning management, road condition prediction, target personnel management, flood rescue party management, etc. It should be noted that the above scenarios are only examples and not limit the specific application scenarios of the system 200 for flood early warning in the smart city. Those skilled in the art may apply the system 200 for flood early warning in the smart city to any other suitable scenarios on the basis of the contents disclosed in the embodiment.

In some embodiments, the system 200 for flood early warning in the smart city may be applied to warning work management. When applied to early warning management, t the system 200 for flood early warning in the smart city may upload the relevant data (such as precipitation information) collected through the meteorological management platform and the relevant data (such as drainage capacity) collected by the water affairs platform to the sensor network platform 240, which may summarize and process the collected data, for example, the sensor network platform 240 may divide the collected relevant data by time, precipitation intensity, region, etc. The sensor network platform 240 then uploads the further summarized and processed data to the flood early warning management platform 230, and the flood early warning management platform 230 makes strategies or instructions related to the early warning based on the processing of the collected data. For example, the strategies or instructions related to the early warning include determining the regional ponding risk level of the target area and generating flood early warning information of different degrees and start flood warning.

In some embodiments, the system 200 for flood early warning in the smart city may be applied to road condition prediction. When applied to road condition prediction, the system 200 for flood early warning in the smart city may upload the road network information of the target area (such as schools) obtained through the traffic management platform, the historical regional ponding information of the target area and the historical road ponding information of each road in the target area obtained through the water affairs platform, and the environmental information of the roads in the target area obtained through the geographic information system to the sensor network platform 240, and the sensor network platform 240 may summarize and process the collected data. For example, the sensor network platform 240 may divide the collected data according to the complexity of the road network (such as the number of intersections) and classify the degree of historical ponding. The sensor network platform 240 then uploads the further summarized and processed data to the flood early warning management platform 230. The flood early warning management platform 230 determines the prediction information related to the road conditions based on the processing of the collected data. For example, the prediction information related to the road conditions includes the ponding risk, ponding section, and road damage risk of each road in the area within 5 km from the school within the target time period.

In some embodiments, the system 200 for flood early warning in the smart city may be applied to target personnel management. When applied to the target personnel management, the system 200 for flood early warning in the smart city may upload the road monitoring information (such as monitoring video, etc.) obtained through the traffic management platform to the sensor network platform 240, and the sensor network platform 240 may summarize and process the collected road monitoring information. For example, the sensor network platform 240 may sort the collected road monitoring information according to the distance from the flood early location and classify the collected road monitoring information according to the nearest flood severity, etc. The sensor network platform 240 then uploads the further summarized and processed data to the flood early warning management platform 230, and the flood early warning management platform 230 makes strategies or instructions related to the target personnel management based on the processing of the collected data. For example, the strategies or instructions related to the target personnel management include the regional congestion degree in the area within 5 km from the flood location within the target time period and the road congestion degree of each road in the region within the target time period.

In some embodiments, the system 200 for flood early warning in the smart city may be applied to the management of flood rescue party. When applied to the management of the flood rescue party, the object platform 250 may be used to collect data related to the rescue party, such as the location of the rescue party. The system 200 for flood early warning in the smart city may also obtain the rescue information of the target area through the emergency management platform. The object platform 220 may upload the collected data related to the above to the sensor network platform 240, and the sensor network platform 240 may summarize and process the collected data. For example, the sensor network platform 240 may divide the collected data according to the flood rescue area and the current location of the rescue party. The sensor network platform 240 then uploads the further summarized and processed data to the flood early warning management platform 230, and the flood early warning management platform 230 makes strategies or instructions related to the management of the rescue party based on the processing of the collected data. For example, the strategies or instructions related to the management of the rescue party include the determination of the rescue party and the route from the rescue party to the rescue location.

In some embodiments, the system 200 for flood early warning in the smart city may be composed of a plurality of flood early warning subsystems, each of which may be applied to a scenario. The system 200 for flood early warning in the smart city may comprehensively manage and process the data obtained by each subsystem and the data output by each subsystem, and then obtain relevant strategies or instructions for assisting flood early warning.

For example, the system 200 for flood early warning in the smart city may include a subsystem for warning management, a subsystem for road condition prediction, a subsystem for target personnel management, and a subsystem for flood rescue party management. The system 200 for flood early warning in the smart city serves as the superior system of each subsystem.

As an example, the system 200 for flood early warning in the smart city manages each subsystem and obtains corresponding data based on the subsystem to obtain strategies for flood warning:

The system 200 for flood early warning in the smart city may obtain the precipitation information, drainage capacity information, and other relevant data of the target area based on the subsystem for warning management, obtain relevant data such as road network information, historical regional ponding information, historical road ponding information, and road environmental information in the target area based on the subsystem for road condition prediction, obtain road monitoring information and other relevant data based on the subsystem for target personnel management, obtain the location of the rescue party based on the subsystem for the flood rescue party management.

When the system 200 for flood early warning in the smart city obtains the above data, it may separately set multiple object platforms corresponding to each subsystem for data collection.

After obtaining the above data, the system 200 for flood early warning in the smart city collects and processes the collected data through the sensor network platform 240. The sensor network platform 240 then uploads the further summarized and processed data to the flood early warning management platform 230 through the database of the sensor network platform 240. The flood early warning management platform 230 determines the prediction data related to the flood early warning based on the processing of the collected data.

For example, the sensor network platform 240 may obtain the precipitation information of the target area within the first preset time period on the meteorological management platform and the drainage capacity information of the target area on the water affairs platform. The sensor network platform 210 may upload the above information to the flood early warning management platform 230. Based on the above information, the flood early warning management platform 230 determines the regional ponding risk information of the target area to generate the first flood early warning information of the target area.

For example, when the regional ponding risk level of the target area meets the first preset conditions, the sensor network platform 240 may obtain the road network information of the target area on the traffic management platform, the historical regional ponding information of the target area on the water affairs platform, and the historical road ponding information of each road in the target area. The sensor network platform 210 may upload the above information to the flood early warning management platform 230. Based on the above information, the flood early warning management platform 230 determines the ponding sections of each road and generates the second flood early warning information of the target area.

For another example, the sensor network platform 240 may also obtain the road ponding information of each road in the target area on the object platform and the environmental information of the road on the geographic information system. The sensor network platform 210 may upload the above information to the flood early warning management platform 230, and the flood early warning management platform 230 determines the road damage information of the road based on the above information, so as to determine the third flood early warning information.

For another example, when the regional ponding risk level of the target area meets the second preset condition, the sensor network platform 240 may obtain the road monitoring information of the target area within the first preset range on the traffic management platform. The sensor network platform 210 may upload the road monitoring information to the flood early warning management platform 230, and the flood early warning management platform 230 may determine the target terminal based on the road monitoring information and send the first flood early warning information to the target terminal of the target personnel.

For another example, when the regional ponding risk level of the target area meets the third preset condition, the sensor network platform 240 may obtain the rescue information of the target area within the second preset range on the emergency management platform. The sensor network platform 240 may upload the rescue information to the flood early warning management platform 230, and the flood early warning management platform 230 sends the rescue reminder information to the rescue party based on the rescue information.

For those skilled in the art, after understanding the principle of the system, it is possible to transfer the system to any other suitable scenario without departing from this principle.

In the following, the application of the system 200 for flood early warning in the smart city to flood early warning scenarios will be taken as an example to explain the system 200 for flood early warning in the smart city in detail.

The flood early warning management platform 230 may be configured to obtain precipitation information of the target area within the first preset time period through the meteorological management platform, obtain the drainage capacity information of the target area through the water affairs platform, determine the regional ponding risk level of the target area based on the precipitation information and drainage capacity information, and generate the first flood early warning information of the target area according to the regional ponding risk level. For more information about generating the first flood early warning information of the target area, please refer to FIG. 3 and its related descriptions.

In some embodiments, when the regional ponding risk level of the target area meets the first preset condition, the flood early warning management platform 230 may also be configured to obtain the road network information of the target area through the traffic management platform., obtain the historical ponding situation of the target area through the water affairs platform, determine the road ponding risk of each road in the target area according to the road network information and historical ponding, determine the ponding sections in the target area based on the risk of road ponding, and generate the second flood early warning information of the target area according to the ponding sections in the target area. For more descriptions about generating the second flood early warning information of the target area, please refer to FIG. 4 and its related descriptions.

In some embodiments, the flood early warning management platform 230 may also be configured to obtain the road ponding risk of each road in the target area, obtain the environmental information of each road in the target area through the geographic information system, determine the road damage information of each road according to the road ponding risk and environmental information of each road, and determine the third flood early warning information of the target area based on the road damage information corresponding to each road in the target area.

In some embodiments, when the regional ponding risk level of the target area meets the second preset condition, the flood early warning management platform 230 may also be configured to obtain the road monitoring information of the target area within the first preset range through the traffic management platform, determine the target terminal based on the road monitoring information, the target terminal being the terminal used by the target personnel for flood early warning, and send the first flood early warning information to the target terminal. For more descriptions about generating the first flood early warning information of the target area, please refer to FIG. 9 and its related descriptions.

In some embodiments, when the regional ponding risk level of the target area meets the third preset condition, the flood early warning management platform 230 may also be configured to obtain the rescue information of the target area within the second preset range through the emergency management platform, the rescue information at least including the information of the rescue party and send rescue reminder information to the rescue party. For more descriptions about sending a rescue reminder to the rescue party, please refer to FIG. 10 and its related descriptions.

It should be noted that the above descriptions of the system and its components is only for convenience of description and does not limit the present disclosure to the scope of the embodiments. It may be understood that for those skilled in the art, after understanding the principle of the system, it is possible to arbitrarily combine various components or form a subsystem to connect with other components without departing from this principle. For example, the sensor network platform and the rescue management platform may be integrated into one component. For another example, each component may share a storage device, and each component may have its own storage device. Such deformation is within the protection scope of the present disclosure.

Figure 3:
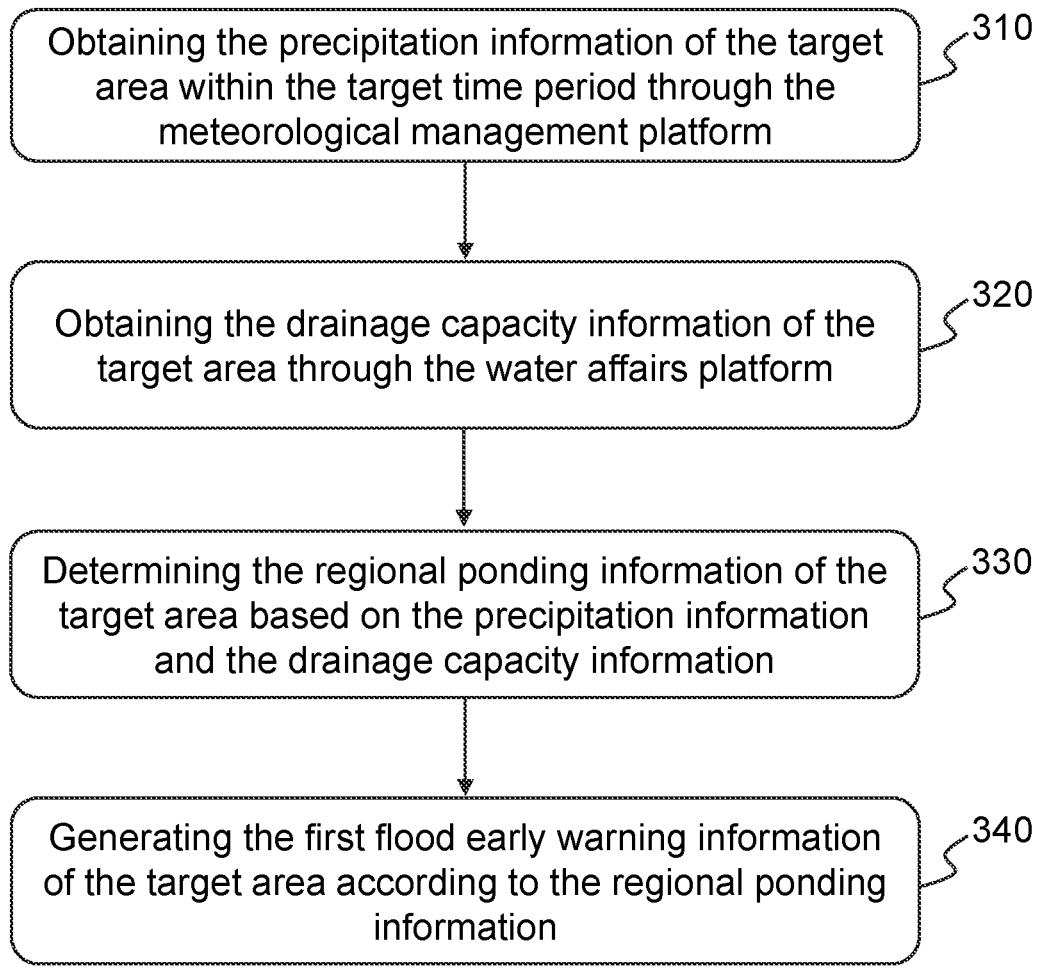
FIG. 3 is an exemplary flowchart of a method for a flood early warning in a smart city based on an Internet of Things according to some embodiments of the present disclosure.

FIG. 3 is an exemplary flowchart of a method for a flood early warning in a smart city based on an Internet of Things according to some embodiments of the present disclosure. In some embodiments, the process 300 may be executed by the system 200 for flood early warning in the smart city or the flood early warning management platform 230.

In some embodiments, the system 200 for flood early warning in the smart city or the flood warning management platform 230 may execute the process 300 according to actual needs.

In some embodiments, in respond to a flood early warning request submitted by a user (such as a government staff), the system 200 for flood early warning in the smart city may execute the flood early warning method provided in the embodiments of the present disclosure according to the flood early warning request, so as to determine the regional ponding information in the target area. The flood warning request may be an operation instruction for estimating the ponding situation in the target area caused by the precipitation that the target area is suffering or may suffer. For example, the user may input a flood early warning request through the user platform 210, and the service platform 220 may analyze the flood early warning request to determine the precipitation conditions (such as rainstorm) that the target area is suffering or may suffer and send it to the flood warning management platform 230. The flood early warning management platform 230 may execute the process 300 according to the flood early warning request to determine the ponding situation in the target area.

In some embodiments, the system 200 for flood early warning in the smart city may continuously or periodically execute the process 300 to achieve real-time monitoring of ponding situation in the target area. In some embodiments, the system 200 for flood early warning in the smart city may execute the process 300 according to the needs of other methods (such as subsequent process 600, process 800, etc.).

As shown in FIG. 3, the process 300 may include the following steps.

Step 310: obtaining the precipitation information of the target area within the target time period through the meteorological management platform.

The meteorological management platform may refer to the cloud platform or database that records the weather information of the target area. For example, the meteorological management platform may be the database of meteorological observation stations in the target area. The meteorological management platform may be an external database. The meteorological management platform may communicate with at least one platform in the system 200 for flood early warning in the smart city (such as service platform 220, flood early warning management platform 230, etc.), so as to send precipitation information to the flood warning management platform 230. In some embodiments, the data in the meteorological management platform may be obtained through the meteorological sensors in the sensor network platform 240. For example, the meteorological management platform may determine the current or future weather information of the target area according to the meteorological information obtained by meteorological satellites, rainfall meteorological stations, and other meteorological sensors. For example, the current precipitation information may be determined according to the precipitation information obtained by the precipitation meteorological station, and the future precipitation information may be estimated in combination with the meteorological cloud map obtained by the meteorological satellite. For another example, the meteorological management platform may record weather information in real time. When the system 200 for flood early warning in the smart city needs it, the meteorological management platform may call the weather information of the past time to send it to the system 200 for flood early warning in the smart city.

The target area may refer to the area suffering flood or likely to suffer from flood. For example, the target area may be the rainfall area that is suffering from rainstorm and the surrounding area affected by rainstorm. For another example, the target area may be an area that may be affected by floods in the surrounding area to form a flood disaster.

In some embodiments, the target area may be set by the user. For example, the target area set by the user may be included in the flood early warning request input by the user on the user platform 210. In some embodiments, the target area may be determined according to actual precipitation conditions or actual needs. For example, the target area may be an area within the precipitation range of the precipitation weather. As another example, the target area may be area where the ponding situation need to be determined.

The target time period may be at least part of the duration of precipitation weather in the target area. For example, the target time period may be the time period from the beginning of the rainstorm to the end of the rainstorm currently suffered in the target area. In some embodiments, the target time period may include a plurality of preset sub time periods. For example, the target time period may include the first hour, the second hour, . . . , the $n^{th}$ hour, etc. of the beginning of the rainstorm.

In some embodiments, the target time period may be determined according to precipitation conditions and actual demand. For example, when the user counts that the current rainstorm may cause ponding in the target area, the target time period may start when the rainfall speed of the rainstorm is greater than the drainage capacity of the target area and end at the current time or the estimated end time of the rainstorm. For another example, when the user counts the snow situation in the target area, the target time period may start when the snow will not melt naturally until the snow will melt naturally.

The precipitation information may reflect the precipitation of the target area in the target time period. For example, the precipitation information may include the precipitation of liquid water or solid water falling to the target area caused by rainfall, snow, and other weather within the target time period.

In some embodiments, the specific content and expression form of precipitation information may be determined according to actual needs. For example, while evaluating whether the rainstorm weather will affect the traffic in the target area, the precipitation information may include the total precipitation of the current rainstorm weather in the target area and the current rainfall rate. While evaluating the impact of snow on the target area when the temperature turns warm, the precipitation information may include the total precipitation of solid water (such as snow, hail, etc.) in the target area in winter. In some embodiments, the precipitation information may also include the influence of other weather factors on precipitation. For example, the precipitation information may also include wind direction, wind intensity, etc., and the shift of the precipitation range caused by the wind may be determined based on the wind direction and wind intensity. In some embodiments, the precipitation information of the target area may further include the drainage information of each road in the target area.

Step 320: obtaining the drainage capacity information of the target area through the water affairs platform.

The water affairs platform may refer to a cloud platform or database that records drainage information of a target area. For example, the water platform may be the database of the urban drainage system in the target area. the urban drainage system may refer to the engineering facility system that processes and discharges the urban sewage and rainwater in the target area, such as the urban sewer. Drainage information may include the distribution of urban drainage system, historical drainage data of urban drainage system, and the direction of sewage/rainwater in urban drainage system.

At least one platform in the system 200 for flood early warning in the smart city (such as the service platform 220, the flood warning management platform 230, etc.) may communicate with the water affairs platform, so that the system 200 for flood early warning in the smart city may realize data exchange with the water affairs platform. For example, the system 200 for flood early warning in the smart city may receive the water affairs information (such as the drainage capacity information of the target area) sent by the water affairs platform through the platform communicating with the water affairs platform. In some embodiments, the data in the water affairs platform may be obtained through a sensor arranged in the urban drainage system.

The drainage capacity information may refer to the drainage capacity of liquid ponding on the ground floor of the target area. For example, the drainage capacity information may include the maximum amount of ponding that may be discharged from the target area per hour.

In some embodiments, the drainage capacity information may include whole drainage capacity information of the target area, for example, the maximum hourly discharge of the target area, for another example, the natural drainage of the target area (such as ground evaporation, land absorption, etc.) and active drainage measures (such as water pump truck, water pump, etc.). In some embodiments, for example, the drainage capacity information may include drainage capacity information of each road in the target area, for example, the location of each outlet of each road, the maximum discharge per hour, etc. In some embodiments, the drainage capacity information of the target area may further include the drainage capacity information of each road in the target area.

Step 330: determining the regional ponding information of the target area based on the precipitation information and the drainage capacity information.

The regional ponding information may refer to the ponding situation of the target area within the target time period.

In some embodiments, the time correspondence between the regional ponding information and the ponding situation may be determined according to the actual situation. For example, if the precipitation information includes the estimated precipitation in the next day and it is required to estimate the future ponding, the corresponding regional ponding information may be used to describe the possible ponding of the target area in the next day.

In some embodiments, regional ponding information may be represented by ponding height. The ponding height may be the relative height between the horizontal line height of ponding and the reference height of the target area.

In some embodiments, the regional ponding information may also be characterized as a regional ponding risk level. The regional ponding risk level may be a parameter describing the ponding situation in the target area. The more ponding amount in the target area is, the higher the regional ponding risk level is.

In some embodiments, the regional ponding risk level may be determined according to the ponding height of the target area. For example, the ponding height threshold may be preset, and the ponding height threshold may include a first ponding height threshold and a second ponding height threshold, and the second ponding height threshold is higher than the first ponding height threshold. When the ponding height of the target area is less than the first ponding height threshold, the regional ponding risk level of the target area may be level 1. When the ponding height of the target area is greater than or equal to the first ponding height threshold and less than the second ponding height threshold, the regional ponding risk level of the target area may be level 2. When the ponding height of the target area is greater than the second ponding height threshold, the regional ponding risk level in the target area may be level 3.

In some embodiments, the relevant data of precipitation information and drainage capacity information of the target area may be compared to determine the regional ponding risk level of the target area. For example, when the precipitation speed in the precipitation information (such as the current precipitation rate in the target area) is less than the drainage speed in the drainage capacity information (such as the maximum ponding amount that may be discharged per hour in the target area), it may be indicated that there is no ponding in the target area, and the regional ponding risk level may be level 1. When the precipitation speed in the precipitation information is greater than the total drainage speed in the drainage capacity information, it is indicated that the target area has begun to pond. At this time, the regional ponding risk level is greater than level 1.

In some embodiments, the regional ponding risk level may be determined based on the difference between precipitation and drainage. For example, the total precipitation and total drainage of the target area may be determined according to the precipitation speed and drainage speed of the target area, so as to determine the difference between the total precipitation and total drainage of the target area, and the ponding height may be estimated according to the area and altitude of the target area, so as to determine the regional ponding risk level. In some embodiments, the regional ponding risk level may also be updated based on the currently known ponding situation. For example, when calculating the regional ponding risk level within the third hour after the rainstorm, the regional ponding risk level within the third hour may be determined according to the regional ponding risk level determined within the second hour and the net ponding within the third hour.

In some embodiments, the regional ponding information may also be determined by the regional ponding information determination model. The input of the regional ponding information determination model may be the precipitation information and drainage capacity information of the target region, and the output of the regional ponding information determination model may be the regional ponding information of the target region. In some embodiments, the regional ponding information may be presented in the form of a vector, each element of the vector may correspond to a regional ponding risk level, and the element value may reflect the probability of the regional ponding risk level.

In some embodiments, the regional ponding information determination model may be trained based on historical data. The historical precipitation information and historical drainage capacity information of the target area may be used as training samples, and the historical ponding situation of the target area may be used as training labels. The training samples with marks are input into the initial regional ponding information to determine the model, and the initial regional ponding information is updated through training to determine the parameters of the model. When the training model meets the preset conditions, the training ends, and the trained regional ponding information is obtained to determine the model.

In some embodiments, the time relationship between the regional ponding information and the precipitation information and the drainage capacity information may be determined according to the target time. For example, if the target time is a past time period, the corresponding regional ponding information may describe the ponding situation within the past time period. For another example, if the target time is a future time period, the corresponding regional ponding information may describe the ponding situation within the future time period.

In some embodiments, the water flood may be determined based on the area of the target area. The flood road may refer to the road affected by flood. Flood roads may include ponding sections, damaged sections, etc. For more descriptions about ponding sections, please refer to FIG. 4, FIG. 5A and its related descriptions. For more descriptions about damaged sections, please refer to FIG. 6, FIG. 7 and its related descriptions.

Step 340: generating the first flood early warning information of the target area according to the regional ponding information.

The first flood early warning information may refer to the relevant warning information to remind the residents of the target area of the risk of ponding in the target area. For example, the first flood early warning information may include information such as ponding situation and the duration of ponding in the target area.

In some embodiments, the first flood early warning may be determined based on regional ponding information. For example, the current ponding situation of the target area may be determined according to the regional ponding information describing the current ponding situation. For another example, the future ponding situation of the target area may be determined according to the regional ponding risk of each future time period, and the duration of ponding may be determined according to the time period in which the regional ponding risk level is 1 in the regional ponding risk of each future time period. In some embodiments, the regional ponding risk level threshold may also be set. When the ponding risk level of the target area is less than the reminder threshold, the first flood early warning information will not be sent. For example, the reminder threshold may be level 2. When the ponding risk level in the target area is level 1, the first flood early warning information will not be sent.

In some embodiments, after the flood early warning management platform 230 determines the first flood early warning information, it may be sent to the user platform 210 through the service platform 220 and sent by the user platform 210 to the target terminal that needs to receive the first flood early warning information. The target terminal that needs to receive the first flood early warning information may be the terminal of the personnel in the target area. In some embodiments, when the regional ponding information of the target area meets the second preset condition, the road monitoring information within the first preset range of the target area may also be obtained through the traffic management platform, the target terminal is determined based on the road monitoring information, the target terminal is the terminal used by the target personnel for flood early warning, and the first flood early warning information is sent to the target terminal. For more descriptions about the above embodiments, please refer to FIG. 9 and its related descriptions.

In some embodiments, the transmission method of the first flood early warning information may be determined according to the regional ponding information. For example, when the regional ponding risk level in the regional ponding information is not greater than the regional ponding risk level threshold, the first flood early warning information may be directly sent to the personnel in the target area through news, weather forecast, broadcasting, etc. When the regional ponding risk level in the regional ponding information is greater than the regional ponding risk level threshold, the target terminal that needs to receive the first flood early warning information may be determined first, and the first flood early warning information may be sent to the target terminal by telephone or SMS.

The method for flood early warning provided by some embodiments of the present disclosure may determine the regional ponding information of the target area based on the precipitation information and drainage capacity information. The first flood early warning information is generated based on the regional ponding information, so as to realize the warning and broadcasting of flood caused by precipitation and improve the ability of residents to cope with flood. In addition, the method of warning provided by the embodiment of the present disclosure involves multi-dimensional precipitation information and drainage capacity information, thereby improving the accuracy of the flood early warning.

FIG. 4 is an exemplary flowchart of a method for determining ponding sections according to some embodiments of the present disclosure. In some embodiments, the process 400 may be executed by the system 200 for flood early warning in the smart city or the flood early warning management platform 230.

In some embodiments, the process 400 may be executed when the regional ponding information of the target area meets the first preset condition. The first preset condition may refer to the condition that there may be ponding sections in the preset target area. In some embodiments, the first preset condition may include a threshold of a related parameter in the regional ponding information. For example, the first preset condition may include a regional ponding risk level threshold. When the regional ponding risk level in the regional ponding information is greater than the regional ponding risk level threshold, the regional ponding information meets the first preset condition. As shown in FIG. 4, the process 400 may include the following steps.

Step 410, obtaining the road network information of the target area through the traffic management platform.

The traffic management platform may refer to the cloud platform or database that records the road information of the target area. For example, the traffic management platform may be a database of urban planning bureau of the target regional. The traffic management platform may be an external database, which may communicate with at least one platform in the system 200 for flood early warning in the smart city (such as service platform 220, flood early warning management platform 230, etc.), so as to send road network information to the system 200 for flood early warning in the smart city.

The road network information may be the relevant data describing the road network of the target area. For example, the road network information may include the intersection information of each intersection in the target area (such as intersection location, altitude, intersection type, etc.) and the road information of the road between each intersection (such as intersections at both ends of the road, road width, road length, road slope, etc.).

Step 420: obtaining the historical regional ponding information of the target area and the historical road ponding information of each road in the target area through the water affairs platform.

The historical regional ponding information may be the regional ponding information of the target region within the historical time period. For example, the historical regional ponding information may include the historical regional ponding risk level of the target area. The historical time period may be preset. For example, the month of last year may be preset.

The historical road ponding information may refer to the road ponding information of each road in the target area within the historical time period. For more descriptions about road ponding, please refer to step 430 and its related descriptions.

In some embodiments, the water affairs platform may determine the historical regional ponding information of the target area and the historical road ponding information of each road in the target area from the historical data according to the requirements of the flood early warning management platform 230.

Step 430: determining the road ponding information of each road in the target area within the target time period according to the road network information, historical regional ponding information, and historical road ponding information.

Road ponding information may be used to describe the ponding situation of each road within the target time period. Similar to the regional ponding information, the road ponding information may include the ponding height of the road, which may be characterized as the risk level of road ponding.

In some embodiments, modeling or various data analysis algorithms, such as regression analysis and discriminant analysis, may be used to analyze and process the road network information, precipitation information, drainage capacity information, historical regional ponding information, and historical road ponding information to determine the road ponding information of each road in the target area within the target time period.

In some embodiments, the road ponding information of each road in the target area may be determined based on the road ponding information determination model. That is, the road network information, precipitation information, drainage capacity information, historical regional ponding information, and historical road ponding information may be processed according to the road ponding information determination model to determine the road ponding information of each road in the target area. For more information about the road ponding information determination model, please refer to FIG. 5 and its related descriptions.

Step 440: determining the ponding sections in the target area based on the road ponding information.

The ponding sections may refer to sections where the ponding height is greater than the ponding height threshold (such as the first ponding height threshold). In some embodiments, the ponding sections may be determined according to the road ponding risk level in the road ponding information. For example, a ponding section may be a road section with a road ponding risk level greater than level 2.

Step 450: generating the second flood early warning information of the target area according to the ponding sections in the target area.

The second flood early warning information may be the warning information of the ponding sections in the target area. For example, the second flood early warning information may include the warning information of each ponding road in the target area. The early warning information of each ponding road includes the ponding condition of the road (such as the ponding height), the duration of the ponding, and other information.

In some embodiments, step 450 may be performed by the flood early warning management platform 230. For example, after the flood early warning management platform 230 determines the second flood early warning information, it may be sent to the user platform 210 through the service platform 220 and sent by the user platform 210 to the user or terminal that needs to receive the second flood early warning information.

In some embodiments, the transmission method and target of the second flood early warning information may be determined according to the road ponding information of each ponding section. For example, when the road meets the preset conditions, the second flood early warning information of the road may be sent to the electronic signs of the road and its surrounding intersections. The second flood early warning information may also be sent to the target terminal. For more information about the target terminal, please refer to step 340, FIG. 9, and related descriptions.

In some embodiments, the second flood early warning information may be determined based on the road ponding information of each ponding road in the target area. For example, the current ponding height of each ponding road in the target area may be determined according to the road ponding risk level of each ponding road. For another example, the future ponding height of each road may be determined according to the road ponding risk level of each road in the target area within each time period in the future, and the ponding duration of the road may be determined according to the time period when the future ponding height is about 0.

The method for determining the ponding sections provided in some embodiments of the present disclosure may further determine the ponding condition of each road in the target area. Thus, it may guide residents to travel and avoid the damage to vehicles caused by ponding sections.

Figure 5A:
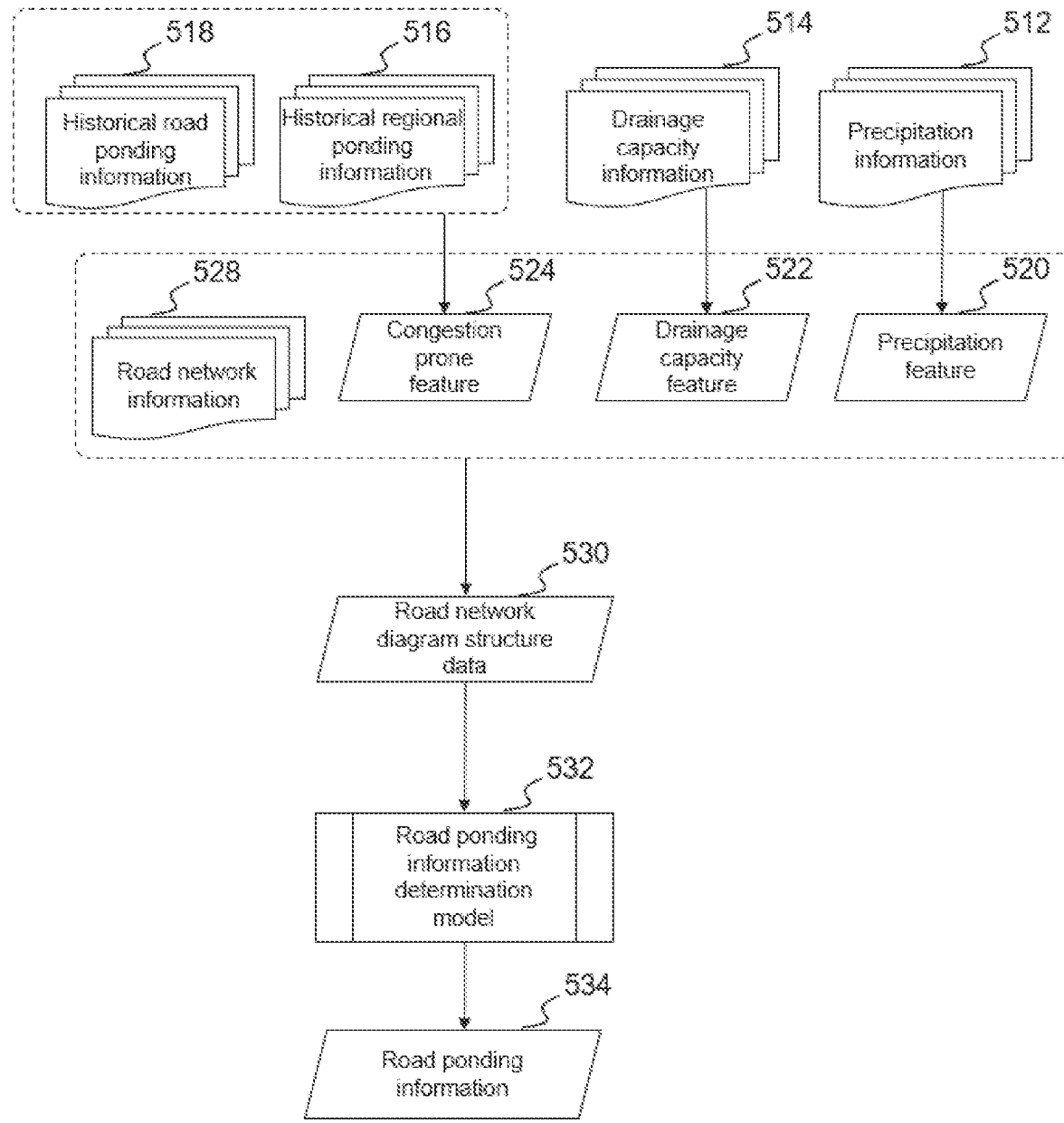
FIG. 5A is an exemplary structural diagram of a road ponding information determination model according to some embodiments of the present disclosure.

FIG. 5A is an example structural diagram of a road ponding information determination model according to some embodiments of the present disclosure.

As shown in FIG. 5A, the road ponding information determination model 532 may process the road network diagram structure data 530 to determine the road ponding information 534 of each road.

The road network diagram structure data 530 of the target area may include nodes and edges between nodes. The node may correspond to each intersection in the target area. Node attributes may reflect the relevant characteristics of the corresponding intersection. Edges may correspond to individual roads in the target area. Edge attributes may reflect the relevant characteristics of the corresponding road. In some embodiments, the node connected by the edge may be the node corresponding to the two intersections connected by the corresponding road, and the direction of the edge may be determined according to the altitude difference. For example, the direction of an edge may be from high altitude to low altitude. For more descriptions about the road network diagram structure data, please refer to FIG. 5B and its related descriptions.

As shown in FIG. 5A, the road network diagram structure data 530 may be determined by the road network information 528, the congestion prone feature 524, the drainage capacity feature 522, and the precipitation feature 520. The nodes in the road network diagram structure data may be determined according to the road network information, and edges and some attributes of edges in the road network diagram structure data may be determined according to congestion prone feature, drainage capacity feature, and precipitation feature.

Figure 5B:
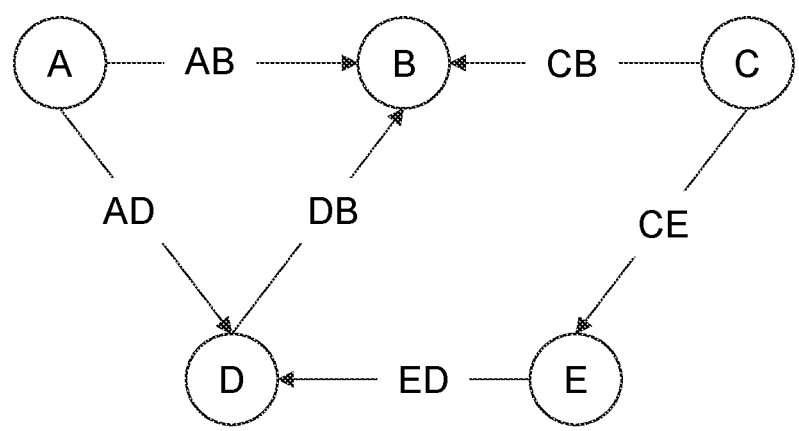
FIG. 5B is a schematic diagram of road network diagram structure data according to some embodiments of the present disclosure.

As shown in FIG. 5B, the road network diagram structure data may include nodes A, B, C, D, E, and edges AD, AB, DB, ED, CE, CB. The nodes A, B, C, D, and E may correspond to the actual intersection one by one. Edges AD, AB, DB, ED, CE, and CB indicate the roads between intersections, and the first node in the edge name of the two intersections connected by the road is higher than the second node. For example, according to edge AD, the altitude of node A is higher than that of node D.

In some embodiments, nodes, edges, and edge attributes in the road network diagram structure may be determined according to the location and altitude of each intersection and road in the road network information. The edge attributes may include precipitation features, drainage features, slope, width, and length of corresponding roads. Slope may describe the steepness of the slope of an edge. Slope may be expressed by slope angle. Node attributes may include the congestion prone feature, drainage capacity feature, and precipitation feature.

The congestion prone feature may describe the easily congestion degree of each intersection in the target area. For example, a certain intersection has ponding for many times in history, and it is very frequent, then the data of the congestion prone feature of the intersection is high. As shown in FIG. 5A, the congestion prone feature 524 may be determined based on the historical road ponding information 518 and the historical regional ponding information 516. For example, the historical time point of ponding may be determined according to the historical regional ponding information, and the ponding situation of each intersection at this historical time point may be determined according to the historical regional ponding information, and the ponding situation and frequency may be used to determine the congestion prone feature. In some embodiments, the congestion prone feature may be determined by manually evaluating the historical road ponding information and the historical regional ponding information.

The drainage capacity features may describe the drainage capacity of each intersection and road in the target area. Drainage capacity features may be expressed quantitatively by a numerical value, for example, the volume of drainage per unit time. As shown in FIG. 5A, the drainage capacity features may be determined by the drainage capacity information of the target area 514.

The precipitation feature may describe the precipitation of each intersection and road in the target area in the target time period. As shown in FIG. 5A, the precipitation features 520 may be determined according to the precipitation information 512 of the target area. In some embodiments, the precipitation feature may also include the current existing ponding volume of each intersection and road in the target area. For example, the ponding volume may be estimated according to the regional ponding risk level in the regional ponding situation.

In some embodiments, the road ponding information determination model may be a graph neural network (GNN). The input of the road ponding information determination model may be the road network diagram structure data of the target area, and the output of the road ponding information determination model may be the road ponding information of each road in the target area. For example, the road ponding information of each road may be characterized as the ponding situation vector of each side. Each ponding situation vector corresponds to the side. The ponding situation vector may include multiple elements, each element corresponds to different road ponding risk levels, and the element value represents the probability at the road ponding risk level. For example, if the ponding situation vector on one side may be (0, 0.7, 0.3, 0), it means that the road ponding risk level of the road corresponding to the side is level 2 with 70% probability and level 3 with 30% probability.

The road ponding information determination model may continuously exchange the attributes of each node (e.g., adjust the ponding volume of each node) in the road network diagram structure data based on the information transmission mechanism to achieve the stable equilibrium state of each node (e.g., the ponding at each point does not flow to adjacent nodes), and determine the output value (i.e., the road ponding information of the above roads) corresponding to the stable equilibrium state of the node based on the processing of the stable equilibrium state of the node (e.g. processing through the feedforward neural network).

In some embodiments, the initial road ponding information determination model may be trained based on the training data to determine the road ponding information determination model. The initial road ponding information determination model may refer to the road ponding information determination model without parameters. The training data may include training samples and training labels, and the training samples may be historical road network diagram structure data determined based on historical data. The training label may be determined based on historical road ponding information. The training samples with marks may be input into the initial road ponding information determination model, and the parameters of the initial road ponding information determination model may be updated through training. When the trained model meets the preset conditions, the training ends, and the trained road ponding information determination model is obtained. The nodes and edges of the historical road network diagram structure data may be the same or similar to the road network diagram structure data, and the specific attributes of nodes and edges may be determined based on the historical drainage capacity information and historical precipitation information. In some embodiments, the historical road ponding risk level in the historical road ponding information may be determined based on the historical ponding height of the road in the historical data. For example, when the historical ponding height of a road is higher than the first ponding height threshold, the label of the road may be (0, 1, 0, 0). For another example, the label of a road may be determined according to the ratio of historical ponding height to ponding height threshold. For example, when the historical ponding height is 30 cm and the first ponding height threshold is 60 cm, the label value may be 30/60=0.5.

The road ponding information determination model shown in some embodiments of the present disclosure takes into account the flow of ponding at each intersection and road when determining the road ponding information of each road, so the determined road ponding information of each road is more in line with the actual situation, which improves the accuracy of road ponding information.

Figure 6:
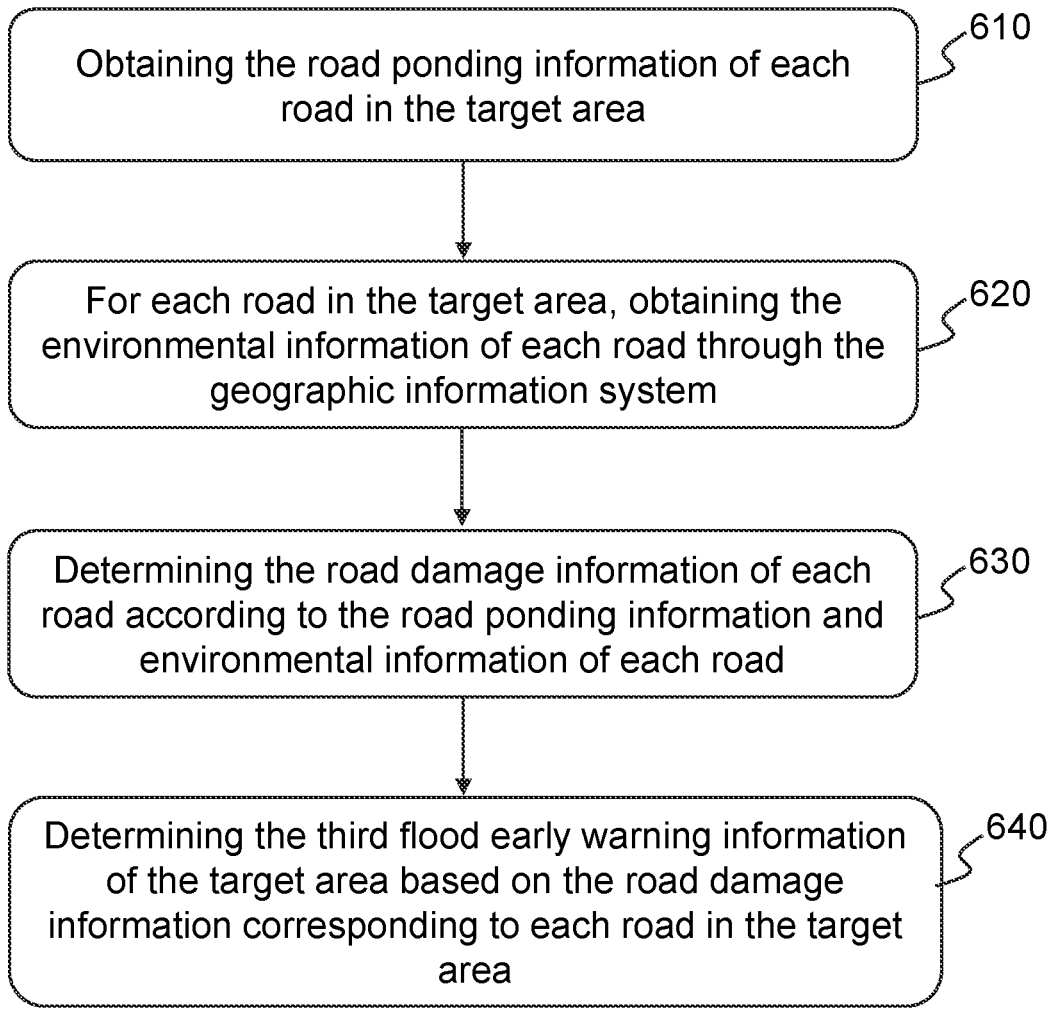
FIG. 6 is an exemplary flowchart of a method for determining a third flood early warning information according to some embodiments of the present disclosure.

FIG. 6 is an exemplary flowchart of a method for determining a third flood early warning information according to some embodiments of the present disclosure. In some embodiments, the process 600 may be executed by the system 200 for flood early warning in the smart city or the flood early warning management platform 230. As shown in FIG. 6, the process 600 includes the following steps.

Step 610: obtaining the road ponding information of each road in the target area.

For more descriptions about road ponding information, please refer to FIG. 4 and its related description.

Step 620: for each road in the target area, obtaining the environmental information of each road through the geographic information system.

The geographic information system may be a cloud platform or database that records the environmental information of each road in the target area. For example, the geographic information system may be the database of the urban planning bureau and the land and resources bureau in the target region. The geographic information system may be an external database, which may communicate with at least one platform in the system 200 for flood early warning in the smart city (such as the service platform 220, the flood early warning management platform 230, etc.), so that the system 200 for flood early warning in the smart city may receive the environmental information of each road in the target area.

Environmental information may reflect the surrounding environment of the road. In some embodiments, the environmental information may include, but is not limited to, weather features, road features, tree features, mountain features, etc., of the road.

The weather features may reflect the weather conditions suffered by the road. For example, weather features may include wind power level, temperature, humidity, precipitation, etc. Road features may reflect the basic situation of the road itself. For example, road features may include the design bearing capacity, construction age, road quality, grade, maintenance, etc. Tree features may reflect the planting of trees around the road. For example, tree features may include trunk thickness, tree height, tree age, and stability. In some embodiments, tree features may be determined according to the average value of trees around the road. For example, the characteristics of the trees that are most prone to tree lodging may be selected. For example, the tree height in the tree features may be the height of the highest tree around the road. Mountain features may reflect the mountain conditions of the mountain where the road is located. For example, mountain features may include mountain soil moisture, mountain soil temperature, the area of a mountain adjacent to a road, and historical damage information of the mountain. Historical damage information refers to the damage of the mountain under various environmental information.

Step 630: determining the road damage information of the road according to the road ponding information and environmental information of the road.

The road damage information may include a road damage probability. In some embodiments, the damage probability of each road may be determined according to the historical damage of the road. For example, the historical damage data similar to the current environmental information may be found from the historical data, and the road damage probability of the road may be determined according to the similarity of the environmental information (such as the Euclidean distance between parameters).

In some embodiments, the road damage information may also include various types of damage probabilities. For example, the road damage information may include the damage probability caused by tree lodging, the damage probability caused by road collapse, and the damage probability caused by debris flow. The road damage information of each type of damage probability may be presented in vector form. Each vector element corresponds to the damage type, and each element value is the damage probability of the corresponding damage type. In some embodiments, the damage probability of each type may be determined according to the relevant data that the corresponding type of road damage has occurred in the historical data. The damage probability of each type may be determined according to the similarity between the current environmental information and the historical environmental information in the relevant data.

In some embodiments, the road ponding information and the environmental information of the road are processed based on the road damage determination model to determine the road damage probability of the road. For more information about the road damage determination model, please to FIG. 7 and its related description.

Step 640: determining the third flood early warning information of the target area based on the road damage information corresponding to each road in the target area.

The third flood early warning information may be the warning information of road damage in the target area. For example, the third flood early warning information may include the early warning information of each road in the target area, and the early warning information of each road includes the damage condition of the road. In some embodiments, the third flood early warning information may be determined based on the road damage information of each road in the target area. For example, the damaged road section may be determined based on the damage probability, and the road damage information of the damaged road section may be used as the damage condition of the road section to generate the third flood early warning information.

In some embodiments, a road whose damage probability is greater than a preset damage probability threshold may be referred to as a damaged section. Damaged sections will be impassable. In some embodiments, the damaged road section may be comprehensively determined based on the damage probability of each type. For example, the weighted calculation may be carried out according to the damage probability of each type. When the weighted result is greater than the probability threshold, the road may be determined as a damaged section. In some embodiments, the transmission method and target terminal of the third flood early warning information may be determined according to the road damage information. For example, the third flood early warning information may be sent to the electronic signs of each damaged road section and its surrounding intersections.

Based on the method for determining damaged road sections provided in the embodiments of the present disclosure, the roads damaged by floods in the target area may be determined, so as to guide residents' travel and avoid the damage to the lives and properties of residents caused by the damaged road sections. In addition, the damaged road sections may also be used by the rescue team to provide assistance in implementing rescue measures, such as closing the damaged road sections and rescuing the trapped people in the damaged road sections.

Figure 7:
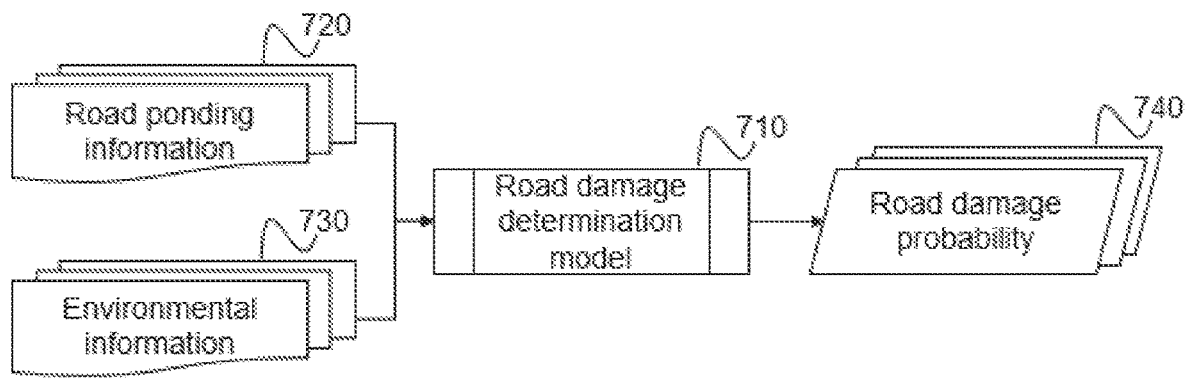
FIG. 7 is an exemplary structural diagram of a road damage determination model according to some embodiments of the present disclosure.

FIG. 7 is an exemplary structural diagram of a road damage determination model according to some embodiments of the present disclosure.

The road damage determination model 710 may be a deep neural network model. As shown in FIG. 7, for each road in the target area, the road ponding information 720 and environmental information 730 of the road maybe input into the road damage determination model 710 and output of the road damage determination model 710 may be the road damage probability 740.

The road ponding information 720 and the environmental information 730 may be input into the road damage determination model 710 through the input layer of the road damage determination model 710 one by one. The road damage determination model 710 processes the road ponding information 720 and the environmental information 730 to determine the road damage probability 740 and output it from the output layer.

In some embodiments, the initial road damage determination model may be trained according to the training data until the end of the training to output the road damage determination model. The initial road damage determination model may be a road damage determination model without parameters.

Training data may include training samples and training labels. The training samples may be historical road ponding situation and historical environmental information at the historical time point. The training label may be the historical road damage probability. The historical road damage probability may be described by a vector, in which the elements of the vector may correspond to different road damage types, and the element value may reflect that the road damage type leads to road damage. For example, if the road has lodging trees without other types of damage, the element value corresponding to the road damage caused by lodging tree in the vector corresponding to the historical road damage probability is 1, and the element value of other elements is 0.

When training the initial road damage determination model, the historical road ponding and historical environmental information of each road may be input into the initial road damage determination model, and the corresponding training output may be determined through the processing of the initial road damage determination model. The input loss function is constructed according to the training output and training label, and the relevant parameters of the model are determined by iterating the initial road damage based on the loss function. Until the output conditions are met, the trained road damage determination model is obtained.

The road damage determination model provided based on some embodiments of the present disclosure may make full use of historical data, so as to improve the accuracy of road damage probability.

Figure 8:
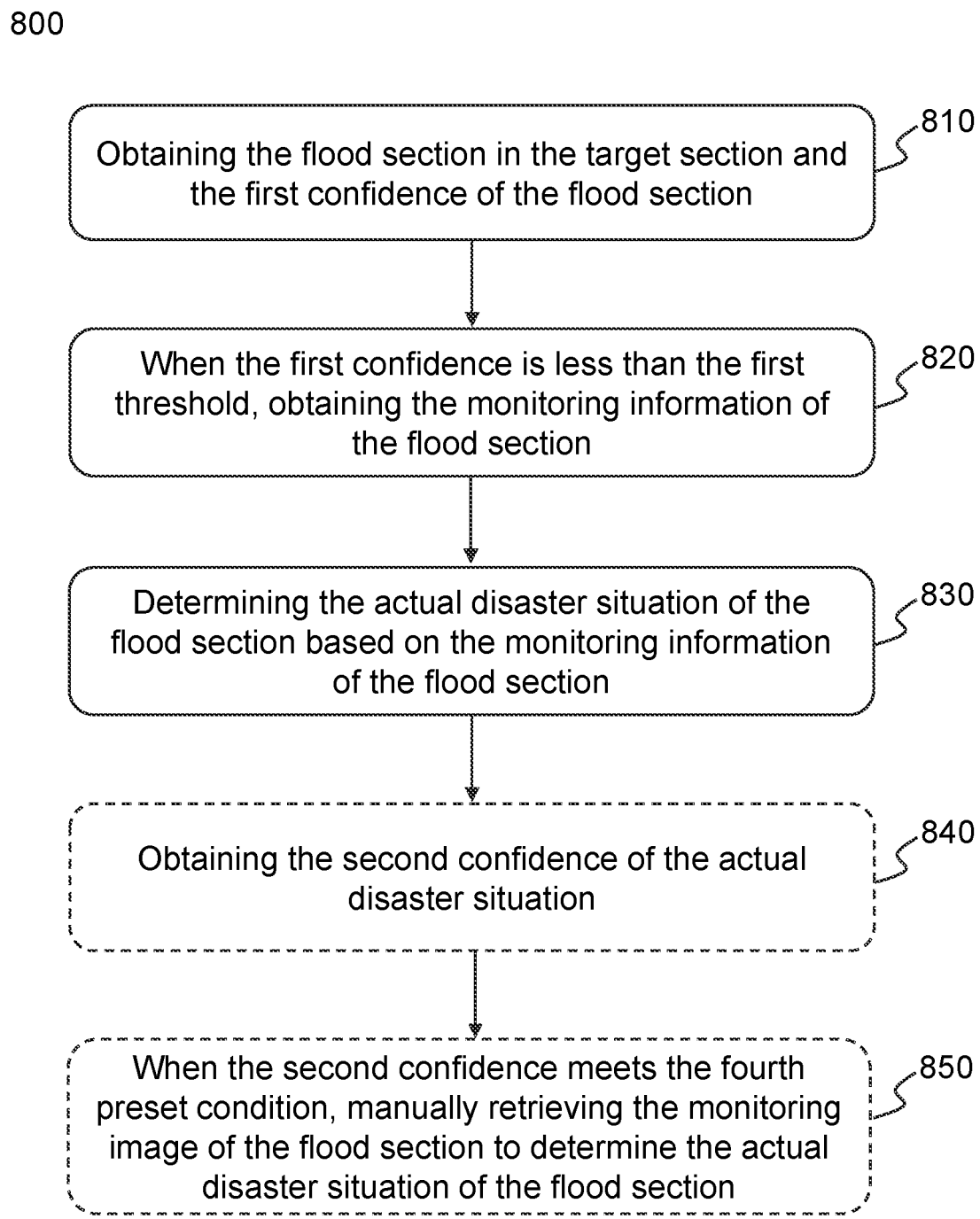
FIG. 8 is an exemplary flowchart of a method for determining an actual disaster situation of a flood section according to some embodiments of the present disclosure.

FIG. 8 is an exemplary flowchart of a method for determining an actual disaster situation of a flood section according to some embodiments of the present disclosure. In some embodiments, the process 800 may be executed by the system 200 for flood early warning in the smart city or the flood early warning management platform 230. As shown in FIG. 8, the process 800 includes the following steps.

Step 810: obtaining the flood sections in the target section and the first confidences of the flood sections.

The flood sections may refer to sections of road that is damaged by ponding. The harm caused by the road ponding may include road ponding caused by the road ponding. Correspondingly, the flood sections may include the ponding sections. The harm caused by the road ponding may also include road damage caused by road ponding. Correspondingly, the water disaster section may also include damage sections. In some embodiments, the flood section may also be determined according to the actual situation. For example, flood sections may be set by users.

The first confidence may refer to the probability of flood disaster on the flood section. In some embodiments, when the flood section is a ponding section, the probability corresponding to the road ponding risk level in the road ponding information may be taken as the first confidence of the flood section. In some embodiments, when the flood section is a damaged road section, the road damage probability may be taken as the first confidence of the flood section.

In step 820: when the first confidence is less than the first threshold, obtaining the monitoring information of the flood section.

The monitoring information of the flood section may include image information or video information that reflects the actual disaster situation in the flood section. For example, the monitoring information of the flood section may include the monitoring video around the flood section. The sensor network platform 240 may call an image acquisition device (such as a surveillance camera) around the flood section to take the image or video obtained by the image acquisition device as the monitoring information of the flood section.

Step 830: determining the actual disaster situation of the flood section based on the monitoring information of the flood section.

When the flood section is a road suffering from flood, the actual disaster situation may include the ponding height, water velocity, etc. caused by the flood of the road. When a flood section is a road damaged by flood, the actual disaster situation may include the location, cause, and scope of damage of the road.

In some embodiments, the actual disaster situation of the flood section may also be described by the flood level. For example, if the ponding height exceeds 60 cm, it may be level 1 flood. For every 60 cm increase in the ponding height, the level of flood disaster will be increased by 1 level.

In some embodiments, the actual disaster situation may be determined by comparing the monitoring information of the flood section with the normal image of the flood section. The normal image of the flood section may refer to the image when the flooded section is not flooded. For example, the height of the image collection device relative to the ground may be determined according to the normal image of the flood section, and then the height of the image collection device relative to horizontal plane of the ponding is determined according to the monitoring image of the flood section, and the actual affected situation may be determined according to the height of the image collection device relative to the ground and the height of the image collection device relative to horizontal plane of the ponding. For another example, the change of the road in the image may be determined through the monitoring image of the flood section and the normal image of the flood section, and the damage situation of the road may be determined according to the change.

In some embodiments, considering that the actual disaster situation determined by the algorithm may be inaccurate due to the resolution of the monitoring information of the flood section and the accuracy of the algorithm. Therefore, the method for determining the actual disaster situation of the flood section provided by the embodiment of the present disclosure may further process the actual disaster situation.

As shown in FIG. 8, the process 800 may also include the following steps.

Step 840: obtaining the second confidence of the actual disaster situation. In some embodiments, step 840 may be performed by the flood early warning management platform 230.

The second confidence may be the accurate probability of the actual disaster situation determined in step 830. The higher the second confidence is, the higher the accuracy of the actual disaster situation determined in step 830 is, and the relevant staff may adopt the actual disaster situation. In some embodiments, the second confidence may be determined according to the accuracy of the algorithm of determining the actual disaster situation in step 830 and the resolution of the monitoring information of the flood section. For example, the resolution confidence may be determined based on the image resolution of the monitoring image of the flood section. The algorithm confidence is determined based on the accuracy of the determination algorithm of the actual disaster situation in step 830. The corresponding second confidence may be the product of the resolution confidence and the algorithm confidence. The accuracy of the algorithm may refer to the proportion of the times of the algorithm outputs being same or similar to the preset label to the total times of tests when testing the algorithm.

In step 850, when the second confidence meets the fourth preset condition, manually retrieving the monitoring image of the flood section to determine the actual disaster situation of the flood section.

The fourth preset condition may be a threshold condition that the second confidence level should satisfy. For example, when the second confidence is less than the corresponding threshold, it may be determined that the second confidence meets the fourth preset condition, otherwise it does not meet the fourth preset condition. As another example, the threshold condition may be the overall threshold condition of the first confidence and the second confidence. That is, the final confidence may be determined based on the first confidence and the second confidence. When the final confidence is less than the corresponding threshold, it may be determined that the second confidence meets the fourth preset condition, otherwise it does not meet the fourth preset condition. The final confidence may be the product of the first confidence and the second confidence. The final confidence may also be the weighted sum of the first confidence and the second confidence.

Manually retrieving the monitoring image of the flood section to determine the actual disaster situation of the flood section may mean that the user invokes the monitoring image of the flood section through the user platform 210 and reports the actual disaster situation of the flood section through the user platform 210.

The method for determining the actual disaster situation of the flood section provided in the embodiment of the present disclosure may determine the actual disaster situation based on the flood section and then guide the rescue team to carry out disaster relief. In addition, the workload of the staff is reasonably distributed through the first confidence and the second confidence. That is, only the actual disaster situation that is difficult to determine by the algorithm may be determined manually, so as to improve the efficiency of flood rescue.

Figure 9:
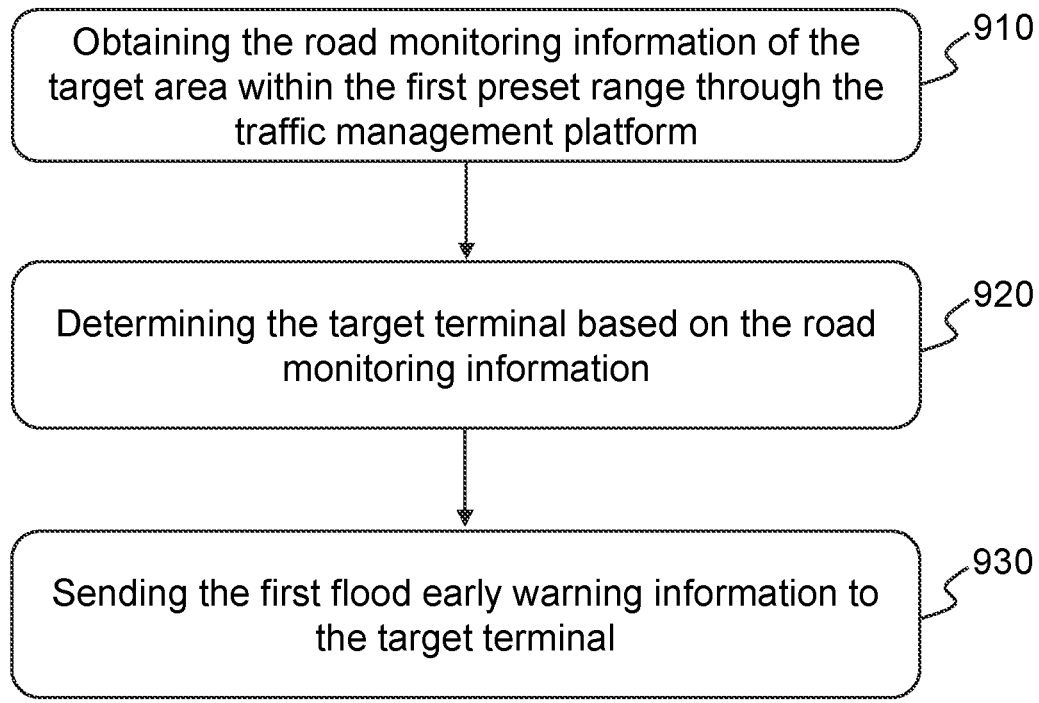
FIG. 9 is an exemplary flowchart of a method for sending flood early warning information according to some embodiments of the present disclosure.

FIG. 9 is an exemplary flowchart of a method for sending flood early warning information according to some embodiments of the present disclosure. In some embodiments, the process 900 may be executed by the system 200 for flood early warning in the smart city or the flood early warning management platform 230. In some embodiments, flow 900 may be performed when the regional ponding information of the target region satisfies the second preset condition.

The second preset condition may be preset to send the first flood early warning information to the target terminal. In some embodiments, the second preset condition may include a threshold value of a related parameter in the regional ponding information. For example, the second preset condition may include the regional ponding risk level threshold. When the regional ponding risk level is greater than the threshold of regional ponding risk level, the regional ponding information meets the second preset condition.

As shown in FIG. 9, the process 900 includes the following steps.

Step 910: obtaining the road monitoring information of the target area within the first preset range through the traffic management platform.

The first preset range may be a range in the target area to be monitored in which there is danger or possible danger. For example, the first preset range may be a range in the target region in which the regional ponding information is higher than the threshold value. The first preset range may also be a range in the target area in which danger may occur, for example, roads near mountainous areas. In some embodiments, the first preset range may be a target region. In some embodiments, the first preset range may be an area of the target area within a preset range and its surroundings. For example, the first preset range may be an area within 500 m around the target area. In some embodiments, the first preset range may also be a flood section and its surrounding area. For example, the first preset range may include a ponding section and/or damaged section and surrounding areas (such as other sections connected to the intersection connected to the section). In some embodiments, the first preset range may be determined according to actual needs. For example, when there are dangerous areas (such as ponding sections and damaged road sections) in the target area, residents may be reminded to not to go to the specific area. The first preset range may include the dangerous area and all roads leading to the specific area.

The road monitoring information may be the road monitoring video obtained by the image acquisition device (such as the monitoring camera) set on each road. In some embodiments, the flood early warning management platform 230 may obtain the road monitoring video obtained by each image acquisition device within the first preset range as the road monitoring information.

Step 920: determining the target terminal based on the road monitoring information.

The target terminal may be the terminal used by the target personnel who need to receive the flood early warning reminder. The target personnel may be a person of the target area within the first preset range.

In some embodiments, the flood early warning management platform 230 may determine the target terminal according to the road monitoring information of the target personnel. For example, the flood early warning management platform 230 may identify pedestrians or vehicles heading for the dangerous area through the road monitoring information within the first preset range and determine the target terminal (such as mobile phone number) of the target personnel (pedestrians and vehicle drivers) according to the relevant data.

In some embodiments, the road monitoring information within the first preset range may be processed through the image recognition model to determine the person or vehicle appearing in the road monitoring information and its identification information (such as ID card, license plate number, etc.). According to the identification information of the person or vehicle, the mobile phone number corresponding to the person or vehicle is determined from other government platforms (such as the vehicle registration authority) as the target terminal.

Step 930: sending the first flood early warning information to the target terminal.

In some embodiments, the flood early warning management platform 230 may send the first flood early warning information to the target terminal according to the target terminal. For example, the first flood early warning information may be sent to the target terminal through the mobile phone number of the target terminal in the form of message, telephone, etc. In some embodiments, the flood early warning management platform 230 may also transmit the first flood early warning information to the target personnel holding the target terminal through radio broadcasting, broadcasting, voice broadcasting, etc. In some embodiments, the transmission mode of the flood early warning management platform 230 may be determined according to the regional ponding information. For example, when the regional ponding risk level is level 1, the flood early warning management platform 230 may send the first flood early warning information by means of SMS. When the regional ponding risk level is level 3, the flood early warning management platform 230 may send the first flood early warning information through mobile phones, radio broadcasts, etc.

In some embodiments, the second flood early warning information and the third flood early warning information may be combined into the first flood early warning information and sent. It should be noted that the second flood early warning information, the third flood early warning information, or other similar information may also be sent separately by referring to the method of process 900.

Based on the sending method of flood early warning information provided in the present disclosure, the target terminal may be accurately determined, and the accuracy of sending flood early warning information is improved. In addition, a reasonable sending method may be reasonably selected according to the actual disaster situation, so as to improve the probability that the target terminal receives flood early warning information.

Figure 10:
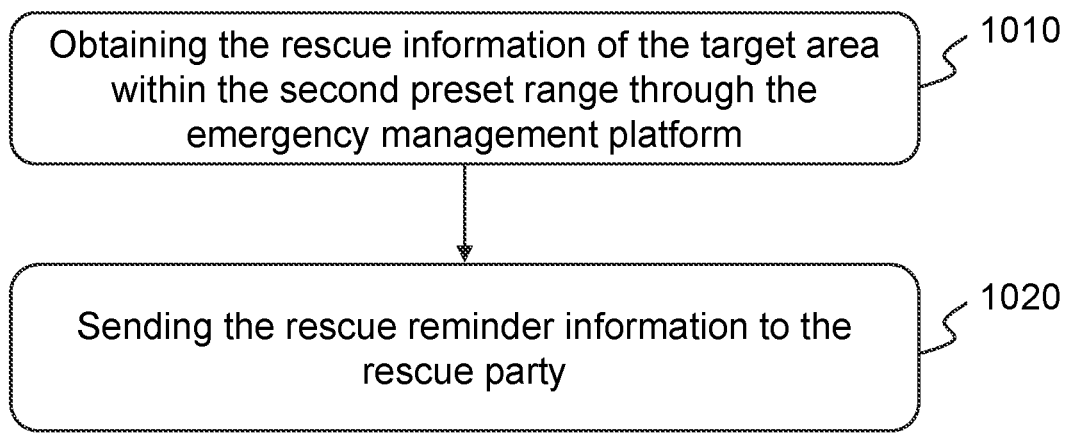
FIG. 10 is an exemplary flowchart of a method for rescue reminder according to some embodiments of the present disclosure.

FIG. 10 is an exemplary flowchart of a method for rescue reminder according to some embodiments of the present disclosure. In some embodiments, the process 1000 may be executed by the system 200 for flood early warning in the smart city or the flood early warning management platform 230.

In some embodiments, the process 1000 may be executed when the regional ponding information of the target area meets the third preset condition.

The third preset condition may be the preset condition that should be met when the target area needs to be rescued. In some embodiments, the third preset conditions may include the threshold of the relevant parameters in the regional ponding information. The third preset condition may include the threshold of regional ponding risk level. When the regional ponding risk level with the largest ponding probability in the regional ponding information is greater than the regional ponding risk level threshold, the regional ponding information meets the third preset condition. As shown in FIG. 10, the process 1000 includes the following steps.

Step 1010: obtaining the rescue information of the target area within the second preset range through the emergency management platform.

The emergency management platform may refer to the cloud platform or database that records the rescue information of the target area. For example, the emergency management platform may be the material database of the emergency management bureau in the target region. The emergency management platform may be an external database, which may communicate with at least one platform in the system 200 for flood early warning in the smart city (such as service platform 220, flood early warning management platform 230, etc.), so that the system 200 for flood early warning in the smart city may receive rescue information.

The second preset range may be a specific area within the target area (such as a flood section, an area where the regional ponding information of the target area exceeds the threshold value, etc.) and its surrounding area (such as an area within 1 km of the damaged road section).

The rescue information may include the relevant information of the rescue party. For example, the relevant information of the rescue party may include rescue buildings (such as emergency shelters), rescue materials, location information of rescue personnel, etc. In some embodiments, the rescue information may also include information about the party to be rescued. For example, the relevant information of the party to be rescued may include the location information of the person to be rescued and the relevant information of a specific area. The person to be rescued may refer to the person who is located in a specific area (such as the flood section, the area where the regional ponding information in the target area exceeds the threshold value, etc.) and whose personal safety is at risk.

Step 1020: sending the rescue reminder information to the rescue party.

In some embodiments, when the rescue information is sent to the rescue party, the rescue reminder information may include the location information of the party to be rescued and the specific area, as well as the flood conditions (such as the ponding risk level in the road section area, road section damage, etc.). After the rescue reminder information is sent to the rescue party, it may remind the rescue party of the location of the party to be rescued for the rescue party to go to. It may also remind the flood situation in specific areas for the rescue party to take corresponding emergency measures, such as setting up interception zones around specific areas. In some embodiments, the rescue reminder information may also be sent to the party to be rescued. When the rescue information is to be sent to the party to be rescued with capacity, the rescue reminder information may include the rescue buildings and rescue materials around the party to be rescued. After the rescue reminder information is sent to the party to be rescued, it may remind the party to be rescued of the forward direction of the rescue buildings or rescue materials. For example, the rescue reminder information may be sent through SMS, telephone, radio, etc.

Based on the rescue reminder method shown in some embodiments of the present disclosure, the communication between the rescue party and the rescued party is realized, and the flood rescue efficiency may be effectively improved.

The embodiments of the present disclosure also provide a non-transitory computer-readable storage medium, which stores computer instructions. When the computer reads the computer instructions in the storage medium, the computer runs any one method for flood early warning in the smart city based on the IoT provided in the embodiment of present disclosure.

The basic concepts have been described above. Obviously, for those skilled in the art, the above detailed disclosure is only an example and does not constitute a limitation of the present disclosure. Although it is not explicitly stated here, those skilled in the art may make various modifications, improvements and amendments to the present disclosure. Such modifications, improvements and amendments are suggested in the present disclosure, so such modifications, improvements and amendments still belong to the spirit and scope of the exemplary embodiments of the present disclosure.

Meanwhile, the present disclosure uses specific words to describe the embodiments of the present disclosure. For example, "one embodiment," "one embodiment," and/or "some embodiments" mean a certain feature, structure or feature related to at least one embodiment of the present disclosure. Therefore, it should be emphasized and noted that "one embodiment" or "one embodiment" or "an alternative embodiment" mentioned twice or more in different positions in the present disclosure does not necessarily refer to the same embodiment. In addition, certain features, structures, or features in one or more embodiments of the present disclosure may be appropriately combined.

In addition, unless explicitly stated in the claims, the sequence of processing elements and sequences, the use of numbers and letters, or the use of other names described in the present disclosure are not used to define the sequence of processes and methods in the present disclosure. Although the above disclosure has discussed some currently considered useful embodiments of the invention through various examples, it should be understood that such details are only for the purpose of explanation, and the additional claims are not limited to the disclosed embodiments. On the contrary, the claims are intended to cover all amendments and equivalent combinations that conform to the essence and scope of the embodiments of the present disclosure. For example, although the implementation of various components described above may be embodied in a hardware device, it may also be implemented as a software only solution, e.g., an installation on an existing server or mobile device.

Similarly, it should be noted that, in order to simplify the description disclosed in the present disclosure and thus help the understanding of one or more embodiments of the invention, the foregoing description of the embodiments of the present disclosure sometimes incorporates a variety of features into one embodiment, the drawings or the description thereof. However, this disclosure method does not mean that the object of the present disclosure requires more features than those mentioned in the claims. Rather, claimed subject matter may lie in less than all features of a single foregoing disclosed embodiment.

In some embodiments, numbers describing the number of components and attributes are used. It should be understood that such numbers used in the description of embodiments are modified by the modifier "about," "approximate" or "generally" in some examples. Unless otherwise stated, "approximately," "approximately" or "generally" indicate that a ±20% change in the figure is allowed. Accordingly, in some embodiments, the numerical parameters used in the present disclosure and claims are approximate values, and the approximate values may be changed according to the characteristics required by individual embodiments. In some embodiments, the numerical parameter should consider the specified significant digits and adopt the method of general digit reservation. Although the numerical fields and parameters used to confirm the range breadth in some embodiments of the present disclosure are approximate values, in specific embodiments, the setting of such values is as accurate as possible within the feasible range.

For each patent, patent application, patent application publications, and other materials cited in the present disclosure, such as articles, books, specifications, publications, documents, etc., the entire contents are hereby incorporated into the present disclosure for reference. Except for the application history documents that are inconsistent with or conflict with the contents of the present disclosure, and the documents that limit the widest range of claims in the present disclosure (currently or later appended to the present disclosure). It should be noted that in case of any inconsistency or conflict between the description, definitions, and/or use of terms in the supplementary materials of the present disclosure and the contents described in the present disclosure, the description, definitions, and/or use of terms in the present disclosure shall prevail.

Finally, it should be understood that the embodiments described in the present disclosure are only usecd to illustrate the principles of the embodiments of the present disclosure. Other deformations may also fall within the scope of the present disclosure. Therefore, as an example rather than a limitation, the alternative configuration of the embodiments of the present disclosure may be regarded as consistent with the teachings of the present disclosure. Accordingly, the embodiments of the present disclosure are not limited to those explicitly introduced and described the present disclosure.

What is claimed is:

1. A method for a flood early warning in a smart city based on an Internet of Things (IoT), comprising:
   obtaining precipitation information of a target area within a target time period through a meteorological management platform;
   obtaining drainage capacity information of the target area through a water affairs platform;
   determining regional ponding information of the target area within the target time period based on the precipitation information and the drainage capacity information;
   generating a first flood early warning information of the target area based on the regional ponding information;
   when the regional ponding information of the target area meets a first preset condition,
   obtaining road network information of the target area through a traffic management platform;
   obtaining historical regional ponding information of the target area and historical road ponding information of each road in the target area through the water affairs platform;
   determining road ponding information of each road in the target area in the target time period through processing road network diagram structure data based on a road ponding information determination model, wherein the road network diagram structure data is constructed based on the road network information, the precipitation information, the drainage capacity information, the historical regional ponding information, and the historical road ponding information, nodes of the road network diagram structure data correspond to each intersection in the target area, attributes of the nodes reflect relevant feature of the corresponding intersection, the attributes of the nodes include a congestion prone feature, a drainage capacity feature, and a precipitation feature, edge of the road network diagram structure data corresponds to each road in the target area, attribute of the edge reflects relevant feature of the corresponding road, a direction of the edge is determined according to a altitude difference of intersections corresponding to two connected nodes, the attribute of the edge includes a precipitation feature, a drainage feature, a slope, a width, and a length of the corresponding road; wherein the road ponding information determination model is a graph neural network (GNN) model, the road ponding information output by the road ponding information determination model is represented by a ponding situation vector, and element value of the ponding situation vector represents a probability at each road ponding risk level;
   determining ponding sections in the target area based on the road ponding information;
   generating a second flood early warning information of the target area based on the ponding sections in the target area;
   determining a first confidence of a flood section based on the probability of the road ponding risk level, wherein the first confidence degree represents the probability of flood disaster on the floow section;
   determining a actual disaster situation of the flood section based on a comparison between monitoring information of the flood section and a normal image when the first confidence is less than a first threshold;

determining a second confidence based on a resolution of the monitoring information and a accuracy of a algorithm of the actual disaster situation, wherein the second confidence represents a accurate probability of the actual disaster situation; and determining the actual disaster situation through manually retrieving the monitoring information of the flood section when the second confidence is less than a second threshold.

2. The method of claim 1, further comprising:

obtaining road ponding information of each road in the target area;

obtaining environmental information of each road in the target area through a geographic information system;

determining road damage information of each road within the target time period based on the road ponding information and the environmental information of each road; and generating a third flood early warning information of the target area based on the road damage information of each road in the target area.

3. The method of claim 1, further comprising:

when the regional ponding information of the target area meets a second preset condition, obtaining road monitoring information of the target area within a first preset range through a traffic management platform;

determining a target terminal based on the road monitoring information, wherein the target terminal is a terminal used by a target person for reminding flood early warnings; and sending a first flood early warning information to the target terminal.

4. The method of claim 1, further comprising:

when the regional ponding information of the target area meets a third preset condition, obtaining rescue information of the target area within a second preset range through an emergency management platform, wherein the rescue information at least includes information of a rescue party; and sending rescue reminder information to the rescue party.

5. A system for a flood early warning in a smart city based on an Internet of Things (IoT), including a user platform, a service platform, a flood early warning management platform, a sensor network platform, and an object platform, wherein the flood early warning management platform is configured to perform operations including:

obtaining precipitation information of a target area within a target time period through a meteorological management platform;

obtaining drainage capacity information of the target area through a water affairs platform;

determining regional ponding information of the target area within the target time period based on the precipitation information and the drainage capacity information;

generating a first flood early warning information of the target area based on the regional ponding information;

when the regional ponding information of the target area meets a first preset condition, obtaining road network information of the target area through a traffic management platform;

obtaining historical regional ponding information of the target area and historical road ponding information of each road in the target area through the water affairs platform;

determining road ponding information of each road in the target area in the target time period through processing road network diagram structure data based on a road ponding information determination model, wherein the road network diagram structure data is constructed based on the road network information, the precipitation information, the drainage capacity information, the historical regional ponding information, and the historical road ponding information, nodes of the road network diagram structure data correspond to each intersection in the target area, attributes of the nodes reflect relevant feature of the corresponding intersection, the attributes of the nodes include a congestion prone feature, a drainage capacity feature, and a precipitation feature, edge of the road network diagram structure data corresponds to each road in the target area, attribute of the edge reflects relevant feature of the corresponding road, a direction of the edge is determined according to a altitude difference of intersections corresponding to two connected nodes, the attribute of the edge includes a precipitation feature, a drainage feature, a slope, a width, and a length of the corresponding road; wherein the road ponding information determination model is a graph neural network (GNN) model, the road ponding information output by the road ponding information determination model is represented by a ponding situation vector, and element value of the ponding situation vector represents a probability at each road ponding risk level;

determining ponding sections in the target area based on the road ponding information;

generating a second flood early warning information of the target area based on the ponding sections in the target area;

determining a first confidence of a flood section based on the probability of the road ponding risk level, wherein the first confidence degree represents the probability of flood disaster on the floow section;

determining a actual disaster situation of the flood section based on a comparison between monitoring information of the flood section and a normal image when the first confidence is less than a first threshold;

determining a second confidence based on a resolution of the monitoring information and a accuracy of a algorithm of the actual disaster situation, wherein the second confidence represents a accurate probability of the actual disaster situation; and determining the actual disaster situation through manually retrieving the monitoring information of the flood section when the second confidence is less than a second threshold.

6. The system of claim 5, wherein the flood early warning management platform is further configured to perform operations including:

obtaining road ponding information of each road in the target area;

obtaining environmental information of each road in the target area through a geographic information system;

determining road damage information of each road within the target time period based on the road ponding information and the environmental information of each road; and generating a third flood early warning information of the target area based on the road damage information of each road in the target area.

7. The system of claim 5, wherein the flood early warning management platform is further configured to perform operations including:
   when the regional ponding information of the target area meets a second preset condition,
   obtaining road monitoring information of the target area within the first preset range through a traffic management platform;
   determining a target terminal based on the road monitoring information, wherein the target terminal is a terminal used by a target person for reminding flood early warning; and
   sending a first flood warning information to the target terminal.

8. The system of claim 5, wherein the flood early warning management platform is further configured to perform operations including:
   when the regional ponding information of the target area meets a third preset condition,
   obtaining rescue information of the target area within a second preset range through an emergency management platform, wherein the rescue information at least includes information of a rescue party; and
   sending rescue reminder information to the rescue party.

* * * * *